(12) United States Patent
Guo et al.

(10) Patent No.: US 12,540,837 B2
(45) Date of Patent: Feb. 3, 2026

(54) DISTANCE MEASUREMENT METHOD, APPARATUS, AND DEVICE, AND COMPUTER-READABLE STORAGE MEDIUM

(71) Applicant: Huawei Technologies Co., Ltd., Guangdong (CN)

(72) Inventors: Zhigang Guo, Shenzhen (CN); Mingsong Shao, Beijing (CN); Yufeng Zheng, Nanjing (CN); Houming Zhai, Nanjing (CN); Qiulai Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 388 days.

(21) Appl. No.: 18/173,637

(22) Filed: Feb. 23, 2023

(65) Prior Publication Data

US 2023/0273050 A1 Aug. 31, 2023

(30) Foreign Application Priority Data

Feb. 25, 2022 (CN) .......................... 202210176860.5
Apr. 22, 2022 (CN) .......................... 202210431385.1

(51) Int. Cl.
*G01D 5/247* (2006.01)
*G01B 7/02* (2006.01)
*G01S 13/08* (2006.01)
*H01R 13/641* (2006.01)

(52) U.S. Cl.
CPC ............. *G01D 5/247* (2013.01); *G01B 7/023* (2013.01); *H01R 13/641* (2013.01); *G01S 13/08* (2013.01)

(58) Field of Classification Search
CPC ...... G01D 5/247; H01R 13/641; G01B 7/023; G01S 13/08
USPC ........................................................ 324/71.1
See application file for complete search history.

(56) References Cited

U.S. PATENT DOCUMENTS

| 2006/0283242 A1* | 12/2006 | Kunow ................... G01B 5/30 |
| | | 73/161 |
| 2017/0261304 A1* | 9/2017 | Vogt ........................ G01B 7/003 |
| 2020/0072895 A1* | 3/2020 | Auzanneau ............ G01R 31/11 |
| 2021/0164807 A1* | 6/2021 | Gillinger ............ G01D 5/24476 |

* cited by examiner

*Primary Examiner* — Raul J Rios Russo
(74) *Attorney, Agent, or Firm* — WOMBLE BOND DICKINSON (US) LLP

(57) ABSTRACT

A method for measuring a distance between connectors of different line cards is described. A first measurement component configured on a first line card sends a measurement signal to a second connector configured on a second line card using a first connector configured on a first line card, and determines a distance between the first connector and the second connector based on the measurement signal. The second connector receives the measurement signal and sends a response result of the measurement signal back to the first measurement component, to enable the first measurement component to determine the distance between the second connector and the first connector. The distance between the first connector and the second connector being determined based on the measurement signal enhances flexibility, universality, and accuracy.

20 Claims, 10 Drawing Sheets

DISTANCE MEASUREMENT METHOD, APPARATUS, AND DEVICE, AND COMPUTER-READABLE STORAGE MEDIUM

CROSS-REFERENCE TO RELATED APPLICATIONS

This application claims priority to Chinese Patent Application No. 202210431385.1, filed on Apr. 22, 2022 and Chinese Patent Application No. 202210176860.5, filed on Feb. 25, 2022. All of the aforementioned applications are hereby incorporated by reference in their entireties.

TECHNICAL FIELD

This disclosure relates to the field of communication technologies, and in particular, to a distance measurement method, apparatus, and device, and a computer-readable storage medium.

BACKGROUND

With development of communication technologies, a signal transmission rate is greatly improved. However, an excessively high transmission rate causes impact such as crosstalk and impedance. A demating is allowed between connectors of different line cards used for signal transmission. By narrowing the demating, that is, reducing a distance between the line cards, the impact caused by the excessively high transmission rate can be reduced. The demating refers to a maximum gap between connectors of two line cards when the line cards are connected. A requirement for the demating is strict, for example, the demating≤0.5 millimeters (MM). Therefore, a distance measurement method is needed to measure a distance between two line cards.

In a related technology, a customized long-and-short-pin connector is disposed on one of two line cards, and a distance between the two line cards is measured by using the long-and-short-pin connector. A length of a short pin is a demating value. The distance between the two line cards is determined according to a contact status between a long pin and the short pin.

However, the foregoing distance measurement method can only measure a distance between connectors of two line cards to determine whether the distance is a demating value, and consequently is poor in flexibility and low in universality.

SUMMARY

This disclosure provides a distance measurement method, apparatus, and device, and a computer-readable storage medium, to resolve a problem provided in the related art. Technical solutions are as follows:

According to a first aspect, a distance measurement method is provided, where the method is applied to a first measurement component on a first line card, a first connector is further configured on the first line card, the first connector is configured to connect to a second connector configured on a second line card, and the method includes: The first measurement component sends a measurement signal to the second connector by using the first connector; and the first measurement component determines a distance between the first connector and the second connector based on the measurement signal.

According to the technical solution provided in this disclosure, the first measurement component sends the measurement signal to the second connector, to detect the distance between the first connector and the second connector based on the measurement signal. Therefore, not only flexibility is high, but also accuracy is higher. In addition, the first measurement component is located on the first line card, the distance between the first connector and the second connector is measured by using the first measurement component, and no external test instrument or tooling is required. Therefore, universality is high, and real-time detection can be implemented.

In an embodiment, the determining, by the first measurement component, a distance between the first connector and the second connector based on the measurement signal includes: receiving, by the first measurement component, a reflected signal of the measurement signal; and determining the distance between the first connector and the second connector based on the measurement signal and the reflected signal. The reflected signal is received after the measurement signal is sent, the distance between the first connector and the second connector is detected based on the measurement signal and the reflected signal, and no external test instrument or tooling is required. Therefore, flexibility and universality are high, and accuracy is also high.

In an embodiment, the sending, by the first measurement component, a measurement signal to the second connector by using the first connector includes: sending, by the first measurement component, the measurement signal to the second connector by using a first signal cable configured on the first line card, where the first signal cable is configured to separately connect to the first measurement component and the first connector, and is further configured to connect to a second signal cable configured on the second connector; and the receiving, by the first measurement component, a reflected signal of the measurement signal includes: receiving, by the first measurement component by using the first signal cable, the reflected signal that is of the measurement signal and that is transmitted by using the second signal cable. The measurement signal is sent and the reflected signal is received by using the same first signal cable and the same second signal cable, thereby reusing the signal cables and reducing costs of distance measurement.

In an embodiment, lengths of the first signal cable and the second signal cable are lengths of n+¼ periods, n is a positive integer, and the period is a transmission period of the measurement signal; and the determining the distance between the first connector and the second connector based on the measurement signal and the reflected signal includes: determining an amplitude of a target signal obtained by superimposing the measurement signal and the reflected signal, and determining the distance between the first connector and the second connector based on the amplitude.

In this length, when the measurement signal is on a rising edge, a reflected signal received at a same location is on a falling edge. Through sending of the measurement signal and superimposition of the reflected signal, the measurement signal and the reflected signal whose edges are approximately aligned are superimposed, and a time domain delay is converted into a level signal, so that the measurement signal and the reflected signal are superimposed and then canceled. The distance between the first connector and the second connector causes a change in a time of flight of a signal, and the amplitude of the target signal obtained by superimposing the sent measurement signal and the received reflected signal changes. Therefore, distance measurement may be implemented based on the amplitude of the target signal obtained through superimposition, and is not only high in universality and accuracy, but also flexible.

In an embodiment, the determining the distance between the first connector and the second connector based on the measurement signal and the reflected signal includes: determining, based on a reflective edge of the reflected signal, a transmission time for transmitting the measurement signal; and determining the distance between the first connector and the second connector based on the transmission time and a transmission rate of the measurement signal. After the measurement signal is sent by using the first measurement component, the reflected signal of the measurement signal is received, and the distance between the first connector and the second connector may be determined based on a time difference between the signal sending and the signal receiving, that is, the transmission time of the measurement signal and the transmission rate of the measurement signal, so that accuracy of the determined distance is higher.

In addition, for a case in which the first measurement component receives the reflected signal, the distance between the first connector and the second connector is determined based on the measurement signal and the reflected signal in the foregoing two manners, so that distance determining manners can be diversified, thereby improving flexibility.

In an embodiment, the determining, by the first measurement component, a distance between the first connector and the second connector based on the measurement signal includes: receiving, by the first measurement component, the measurement signal; and determining the distance between the first connector and the second connector based on a transmission time and a transmission rate of the measurement signal. In addition to receiving the reflected signal of the measurement signal, the first measurement component may further receive the measurement signal, and may determine the distance between the first connector and the second connector based on each received signal. Therefore, universality is higher, and implementations are more diversified.

In an embodiment, the sending, by the first measurement component, a measurement signal to the second connector by using the first connector includes: sending, by the first measurement component, the measurement signal to the second connector by using a third signal cable configured on the first line card, where the third signal cable is configured to separately connect to the first measurement component and the first connector, and is further configured to connect to a fourth signal cable configured on the second connector; and the receiving, by the first measurement component, the measurement signal includes: receiving, by the first measurement component, the measurement signal by using a fifth signal cable, where the fifth signal cable is configured to connect the first measurement component to the first connector, and is further configured to connect to a sixth signal cable configured on the second connector, and the sixth signal cable is further connected to the fourth signal cable. The measurement signal is sent and received based on the signal cables, so that a process of sending and receiving the measurement signal is more accurate. In addition, by using the foregoing two signal cable layouts, a corresponding distance measurement manner may be used, so that distance measurement may be performed in corresponding manners for different implementation environments, and flexibility is higher.

In an embodiment, before the determining the distance between the first connector and the second connector based on a transmission time and a transmission rate of the measurement signal, the method further includes: determining a transmission time of the measurement signal based on a sending time and a receiving time of the measurement signal; and determining the transmission rate of the measurement signal based on a rate of an electrical signal in a vacuum and a relative dielectric constant of a material around a signal cable. When the transmission rate is determined, not only the rate of the electrical signal in the vacuum is considered, but also the relative dielectric constant of the material around the signal cable is considered, so that the determined transmission rate is more accurate, thereby improving accuracy of the determined distance.

In an embodiment, the determining a transmission time of the measurement signal based on a sending time and a receiving time of the measurement signal includes: determining, by the first measurement component in response to that a quantity of times that the measurement signal passes through the first measurement component is not less than a repetition threshold, the transmission time of the measurement signal based on the sending time and the receiving time of the measurement signal. The quantity of times that the measurement signal passes through the first measurement component is not limited, and the measurement signal may pass through the first measurement component for a plurality of times. Therefore, flexibility is high. In addition, the measurement signal passes through the first measurement component for a plurality of times, to prolong the transmission time of the measurement signal, so that it is easier to obtain the transmission time.

In an embodiment, both the first measurement component and the first connector are located on a circuit board of the first line card, and the method further includes: calibrating the first measurement component based on a loopback signal of the circuit board. The first measurement component is calibrated, so that accuracy of the distance measured based on the calibrated first measurement component is higher.

In an embodiment, the first measurement component is located in a chip, the first line card is a board, and the second line card is a backplane.

In an embodiment, the measurement signal is an in-position signal, and the in-position signal is further used to detect a connection status between the first connector and the second connector; and the determining, by the first measurement component, a distance between the first connector and the second connector based on the measurement signal includes: determining, by the first measurement component when determining, based on the in-position signal, that the connection status between the first connector and the second connector is connected, the distance between the first connector and the second connector based on the in-position signal. The distance between the first connector and the second connector starts to be determined only when the connection status between the first connector and the second connector is connected, to effectively control an occasion for starting to determine the distance, improve reliability of distance measurement, and reduce resources consumed for distance measurement when the connection status is disconnected. In addition, distance measurement is implemented by reusing the in-position signal, to not only improve signal utilization, but also improve distance measurement efficiency.

According to a second aspect, a distance measurement method is provided, where the method is applied to a second connector configured on a second line card, the second connector is configured to connect to a first connector configured on a first line card, and the method includes: The second connector receives a measurement signal sent by a first measurement component on the first line card; and the second connector sends a response result of the measurement signal to the first measurement component, to enable the first measurement component to determine a distance between the second connector and the first connector based on the measurement signal.

According to the technical solution provided in this disclosure, after receiving the measurement signal sent by the first measurement component, the second connector sends the response result of the measurement signal to the first measurement component. In this way, the first measurement component can determine the distance between the first connector and the second connector based on the measurement signal. Therefore, not only flexibility is high, but also accuracy is higher. In addition, the distance between the first connector and the second connector can be measured by using the second connector on the second line card and the first measurement component on the first line card, and no external test instrument or tooling is required. Therefore, universality is high, and real-time detection can be implemented.

In an embodiment, the response result is a reflected signal of the measurement signal; the receiving, by the second connector, a measurement signal sent by a first measurement component on the first line card includes: receiving, by the second connector by using a second signal cable configured on the second connector, the measurement signal sent by the first measurement component, where the second signal cable is configured to connect to a first signal cable configured on the first connector, and the first signal cable is configured to separately connect to the first measurement component and the first connector; and the sending, by the second connector, a response result of the measurement signal to the first measurement component includes: sending, by the second connector, the reflected signal to the first measurement component by using the second signal cable. The reflected signal is sent after the measurement signal is received, to enable the first measurement component to detect the distance between the first connector and the second connector based on the measurement signal, and no external test instrument or tooling is required. Therefore, flexibility and universality are high, and accuracy is also high. In addition, the measurement signal is received and the reflected signal is sent by using the same second signal cable, thereby reusing the signal cable and reducing costs of distance measurement.

In an embodiment, the response result is the measurement signal; the receiving, by the second connector, a measurement signal sent by a first measurement component on the first line card includes: receiving, by the second connector by using a fourth signal cable configured on the second connector, the measurement signal sent by the first measurement component, where the fourth signal cable is configured to connect to a third signal cable configured on the first connector, and the third signal cable is configured to separately connect to the first measurement component and the first connector; and the sending, by the second connector, a response result of the measurement signal to the first measurement component includes: sending, by the second connector, the measurement signal to the first measurement component by using a sixth signal cable configured on the second connector, where the sixth signal cable is configured to connect to the fourth signal cable, and is further configured to connect to a fifth signal cable configured on the first connector, and the fifth signal cable is configured to connect the first measurement component to the first connector. In addition to sending the reflected signal of the measurement signal to the first measurement component, the second connector may further send the measurement signal, and the first measurement component is enabled to determine the distance between the first connector and the second connector based on the sent signal. Therefore, universality is higher, and implementations are more diversified. In addition, the corresponding response result may be sent to the first measurement component by using the foregoing two signal cable layouts, so that the response result may be sent in corresponding manners for different implementation environments, to enable the first measurement component to measure the distance. Therefore, flexibility is higher.

In an embodiment, the first measurement component is located in a chip, the first line card is a board, and the second line card is a backplane.

According to a third aspect, a distance measurement apparatus is provided, where the apparatus is applied to a first measurement component on a first line card, a first connector is further configured on the first line card, the first connector is configured to connect to a second connector configured on a second line card, and the apparatus includes:
 a sending module, configured to send a measurement signal to the second connector by using the first connector; and
 a determining module, configured to determine a distance between the first connector and the second connector based on the measurement signal.

In an embodiment, the determining module is configured to: receive a reflected signal of the measurement signal; and determine the distance between the first connector and the second connector based on the measurement signal and the reflected signal.

In an embodiment, the sending module is configured to send the measurement signal to the second connector by using a first signal cable configured on the first line card, where the first signal cable is configured to separately connect to the first measurement component and the first connector, and is further configured to connect to a second signal cable configured on the second connector; and the determining module is configured to receive, by using the first signal cable, the reflected signal that is of the measurement signal and that is transmitted by using the second signal cable.

In an embodiment, lengths of the first signal cable and the second signal cable are lengths of n+¼ periods, n is a positive integer, and the period is a transmission period of the measurement signal; and the determining module is configured to determine an amplitude of a target signal obtained by superimposing the measurement signal and the reflected signal, and determining the distance between the first connector and the second connector based on the amplitude.

In an embodiment, the determining module is configured to: determine, based on a reflective edge of the reflected signal, a transmission time for transmitting the measurement signal; and determine the distance between the first connector and the second connector based on the transmission time and a transmission rate of the measurement signal.

In an embodiment, the determining module is configured to: receive the measurement signal; and determine the distance between the first connector and the second connector based on a transmission time and a transmission rate of the measurement signal.

In an embodiment, the sending module is configured to send the measurement signal to the second connector by using a third signal cable configured on the first line card, where the third signal cable is configured to separately connect to the first measurement component and the first connector, and is further configured to connect to a fourth signal cable configured on the second connector; and the determining module is configured to receive the measurement signal by using a fifth signal cable, where the fifth signal cable is configured to connect the first measurement component to the first connector, and is further configured to connect to a sixth signal cable configured on the second connector, and the sixth signal cable is further connected to the fourth signal cable.

In an embodiment, the determining module is further configured to: determine a transmission time of the measurement signal based on a sending time and a receiving time of the measurement signal; and determine the transmission rate of the measurement signal based on a rate of an electrical signal in a vacuum and a relative dielectric constant of a material around a signal cable.

In an embodiment, the determining module is configured to determine, in response to that a quantity of times that the measurement signal passes through the first measurement component is not less than a repetition threshold, the transmission time of the measurement signal based on the sending time and the receiving time of the measurement signal.

In an embodiment, both the first measurement component and the first connector are located on a circuit board of the first line card, and the apparatus further includes:

a calibration module, configured to calibrate the first measurement component based on a loopback signal of the circuit board.

In an embodiment, the first measurement component is located in a chip, the first line card is a board, and the second line card is a backplane.

In an embodiment, the measurement signal is an in-position signal, and the in-position signal is further used to detect a connection status between the first connector and the second connector; and the determining module is configured to determine, when determining, based on the in-position signal, that the connection status between the first connector and the second connector is connected, the distance between the first connector and the second connector based on the in-position signal.

According to a fourth aspect, a distance measurement apparatus is provided, where the apparatus is applied to a second connector configured on a second line card, the second connector is configured to connect to a first connector configured on a first line card, and the apparatus includes:

a receiving module, configured to receive a measurement signal sent by a first measurement component on the first line card; and
a sending module, configured to send a response result of the measurement signal to the first measurement component, to enable the first measurement component to determine a distance between the second connector and the first connector based on the measurement signal.

In an embodiment, the response result is a reflected signal of the measurement signal; the receiving module is configured to receive, by using a second signal cable configured on the second connector, the measurement signal sent by the first measurement component, where the second signal cable is configured to connect to a first signal cable configured on the first connector, and the first signal cable is configured to separately connect to the first measurement component and the first connector; and the sending module is configured to send the reflected signal to the first measurement component by using the second signal cable.

In an embodiment, the response result is the measurement signal; the receiving module is configured to receive, by using a fourth signal cable configured on the second connector, the measurement signal sent by the first measurement component, where the fourth signal cable is configured to connect to a third signal cable configured on the first connector, and the third signal cable is configured to separately connect to the first measurement component and the first connector; and the sending module is configured to send the measurement signal to the first measurement component by using a sixth signal cable configured on the second connector, where the sixth signal cable is configured to connect to the fourth signal cable, and is further configured to connect to a fifth signal cable configured on the first connector, and the fifth signal cable is configured to connect the first measurement component to the first connector.

In an embodiment, the first measurement component is located in a chip, the first line card is a board, and the second line card is a backplane.

According to a fifth aspect, a distance measurement device is provided, where the device includes a processor, the processor is coupled to a memory, the memory stores at least one instruction, and the at least one instruction is loaded and executed by the processor, to enable the distance measurement device to implement any distance measurement method according to the first aspect or any distance measurement method according to the second aspect.

According to a sixth aspect, a computer-readable storage medium is provided, where the computer-readable storage medium stores at least one instruction, and the instruction is loaded and executed by a processor to implement any distance measurement method according to the first aspect or any distance measurement method according to the second aspect.

According to a seventh aspect, a computer program product is provided, where the computer program product includes a computer program/instruction, and the computer program/instruction is executed by a processor, to enable a computer to implement any distance measurement method according to the first aspect or any distance measurement method according to the second aspect.

According to an eighth aspect, a communication apparatus is provided. The apparatus includes: a transceiver, a memory, and a processor. The transceiver, the memory, and the processor communicate with each other through internal connection path, the memory is configured to store instructions, the processor is configured to execute the instruction stored in the memory, to control the transceiver to receive a signal and control the transceiver to send a signal, and when the processor executes the instruction stored in the memory, the processor is enabled to perform the method according to the first aspect or any possible implementation of the first aspect or perform the method according to the second aspect or any possible implementation of the second aspect.

Optionally, there are one or more processors, and there are one or more memories.

Optionally, the memory may be integrated together with the processor, or the memory and the processor are separately disposed.

In a specific implementation process, the memory may be a non-transitory memory, for example, a read-only memory (ROM). The memory and the processor may be integrated on a same chip, or may be disposed on different chips. A type of the memory and a manner of disposing the memory and the processor are not limited in this disclosure.

According to a ninth aspect, a chip is provided. The chip includes a processor, configured to invoke and run instructions stored in the memory, communication equipment in which the chip is installed is enabled to perform the methods in the foregoing aspects.

According to a tenth aspect, another chip is provided. The chip includes an input interface, an output interface, a processor, and a memory. The input interface, the output interface, the processor, and the memory are connected to each other through an internal connection path. The processor is configured to execute code in the memory. When the code is executed, the processor is configured to perform the methods in the foregoing aspects.

According to an eleventh aspect, a measurement system is provided, where the system includes a first line card and a second line card, a first measurement component and a first connector are configured on the first line card, a second connector is configured on the second line card, and the first connector is configured to connect to the second connector; the first measurement component is configured to perform any distance measurement method in the first aspect; and the second connector is configured to perform any distance measurement method in the second aspect.

DESCRIPTION OF EMBODIMENTS

Terms used in embodiments of this disclosure are only used to explain specific embodiments of this disclosure, but are not intended to limit this disclosure. To make objectives, technical solutions, and advantages of this disclosure clearer, the following further describes implementations of this disclosure in detail with reference to the accompanying drawings.

Figure 1:
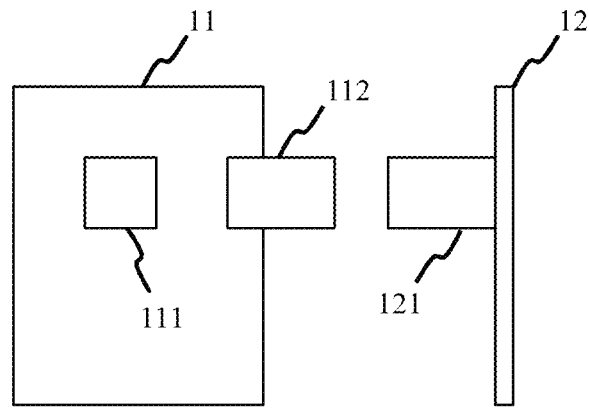
FIG. 1 is a schematic diagram of an implementation environment of distance detection according to embodiments of this disclosure.

An embodiment of this disclosure provides a distance measurement method. FIG. 1 is a schematic diagram of an implementation environment of the method according to this embodiment of this disclosure. The implementation environment includes: a first line card 11 and a second line card 12. A first measurement component 111 is configured on the first line card 11, a first connector 112 is further configured on the first line card 11, a second connector 121 is configured on the second line card 12, and the first connector 112 is configured to connect to the second connector 121 on the second line card 12.

Optionally, the first measurement component 111 sends a measurement signal to the second connector 121 on the second line card 12. After receiving the measurement signal, the second connector 121 sends a response result of the measurement signal to the first measurement component 111. Therefore, the first measurement component 111 determines a distance between the first connector 112 and the second connector 121 based on the measurement signal.

It should be noted that the first line card 11 and the second line card 12 may be line cards on any network device, and the first line card 11 and the second line card 12 may be located on a same network device, or the first line card 11 and the second line card 12 may be located on different network devices. Network devices are, for example, terminals, servers, routers, switches, and virtual machines. For example, the first measurement component is located in a chip, the first line card is a board, and the second line card is a backplane.

The chip may be a time of flight integrated circuit chip (TOF IC). The board may be any circuit component, such as a resistor, a capacitor, or the like. The second line card is a printed circuit board (PCB), and the first line card and the second line card are connected by using the first connector and the second connector, to form a complete circuit system. The second line card may be connected to one or more first line cards, and the first line card and the second line card may be connected together in a manner of plugging, welding, or the like. This is not limited in this embodiment of this disclosure. Optionally, when the first line card is a board, the first connector is a board female connector. When the second line card is a backplane, the second connector is a backplane male connector.

Figure 2:
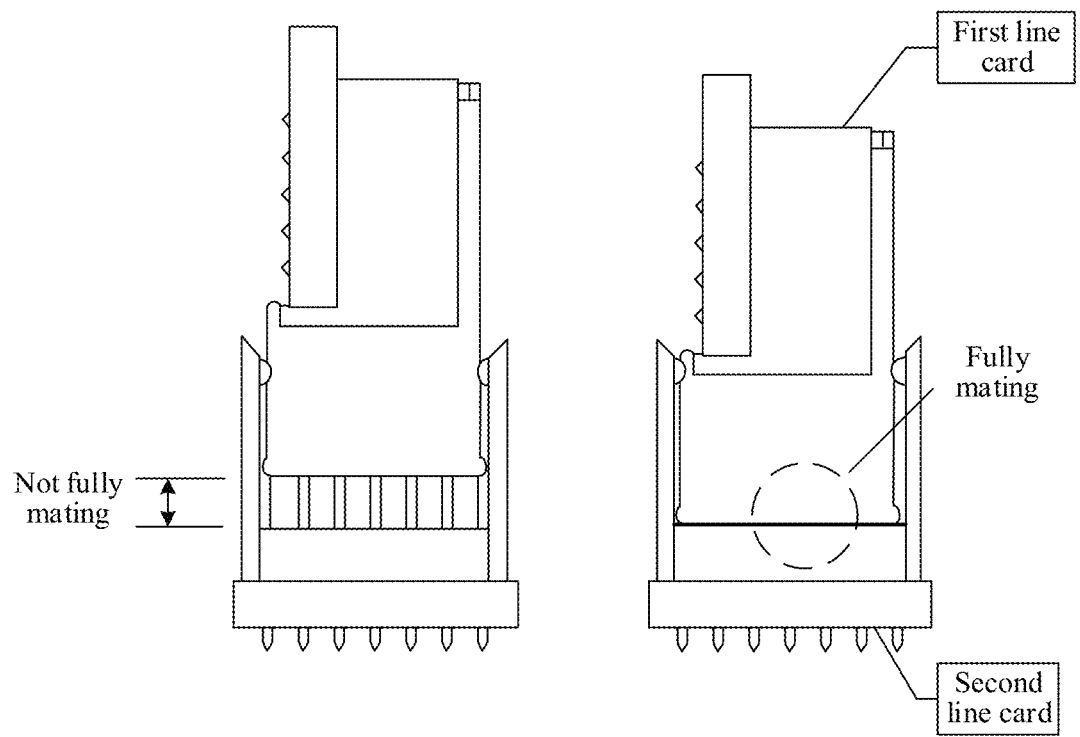
FIG. 2 is a schematic diagram of a connection between a first line card and a second line card according to an embodiment of this disclosure.

FIG. 2 is a schematic diagram of a connection between a first line card and a second line card according to an embodiment of this disclosure. Referring to FIG. 2, when the first line card and the second line card are fully mating, that is, when a distance between the first connector and the second connector is 0, the first line card and the second line card are normally connected. Optionally, when the first line card and the second line card are not fully mating, that is, when there is a distance between the first connector and the second connector, but the distance is not greater than a demating, the first line card and the second line card are also normally connected. The first line card and the second line card are normally connected only when the distance between the first connector and the second connector is required to be not greater than the demating. Therefore, the distance between the first connector and the second connector needs to be measured.

Based on the implementation environments shown in FIG. 1 and FIG. 2, an embodiment of this disclosure provides a distance measurement method. The distance measurement method may be interactively performed by a first measurement component and a second connector. The method includes S201 to S204.

S201: The first measurement component sends a measurement signal to the second connector by using the first connector.

An occasion for sending the measurement signal is not limited in this embodiment of this disclosure. The first measurement component may send the measurement signal to the second connector when the first line card is connected to the second line card. In an embodiment, before the distance between the first connector and the second connector is measured based on the measurement signal, a connection status between the first connector and the second connector is further determined. The distance between the first connector and the second connector is determined based on the measurement signal only when the connection status between the first connector and the second connector is connected. An occasion for measuring the distance between the first connector and the second connector is further determined by determining the connection status, thereby improving reliability of distance measurement, and reduce resources consumed for distance measurement when the connection status is disconnected.

Optionally, an in-position signal is used to detect a connection status between the first connector and the second connector. When determining, based on the in-position signal, that the status between the first connector and the second connector is connected, the first measurement component determines the distance between the first connector and the second connector based on the in-position signal. For example, an in-position signal is sent to determine respective signal level statuses of the first connector and the second connector, to determine a connection status between the first connector and the second connector. For example, when the connection status between the first connector and the second connector is connected, respective signal level statuses of the first connector and the second connector keep consistent, and are both a high level. In this case, the first measurement component may further determine the distance between the first connector and the second connector based on the in-position signal. A relationship between the measurement signal and the in-position signal is not limited in this embodiment of this disclosure, and the measurement signal and the in-position signal may be a same signal. Alternatively, the measurement signal and the in-position signal may be different signals, for example, sent by different components, or sent by a same component (the first measurement component) at different moments. A process in which the first measurement component sends the in-position signal to the second connector is similar to a process in which the first measurement component sends the measurement signal to the second connector. For the process of sending the measurement signal, refer to the following embodiment. Details are not described herein again.

Optionally, the first measurement component may alternatively send the measurement signal to the second connector based on a measurement period, and the measurement period may be a value that is in any unit and magnitude and that is set based on experience. Certainly, the measurement period may also be set based on an implementation environment. Optionally, after receiving a measurement instruction, the first measurement component may start to send the measurement signal to the second connector. The measurement instruction may be automatically triggered by a device. For example, in response to an exception in a system including the first line card and the second line card, the measurement instruction is triggered. Alternatively, the measurement instruction may be manually triggered. For example, after the connection between the first line card and the second line card is completed, assembly personnel need to measure a distance between the first line card and the second line card, to check a connection status between the first line card and the second line card. Based on the foregoing requirement, assembly personnel manually trigger the measurement instruction, and the first measurement component starts to send the measurement signal to the second connector based on the received measurement instruction.

It should be noted that transmission of the measurement signal in the first line card and the second line card is implemented based on cabling of the measurement signal, and a transmission process of the measurement signal varies with a cabling layout of the measurement signal. Different transmission processes correspond to different manners of determining the distance between the first connector and the second connector. The cabling of the measurement signal refers to a transmission path of the measurement signal, and includes but is not limited to original signal cables on the first line card and the second line card, a signal cable in the first connector or the second connector, and a via between the first line card and the second line card. To describe an implementation process of this disclosure more clearly, two cabling layouts used in this disclosure are described.

Cabling layout 1: A first signal cable is configured on the first line card, and the first signal cable is configured to separately connect to the first measurement component and the first connector, and is further configured to connect to a second signal cable configured on the second connector.

Optionally, a signal cable configured to connect to the second connector is disposed in the first connector. That the first signal cable is connected to the first connector means that the first signal cable is connected to the signal cable in the first connector. That the first signal cable is connected to the second signal cable on the second connector means that the first signal cable is connected to the signal cable in the first connector, to connect to the second signal cable on the second connector.

Figure 4:
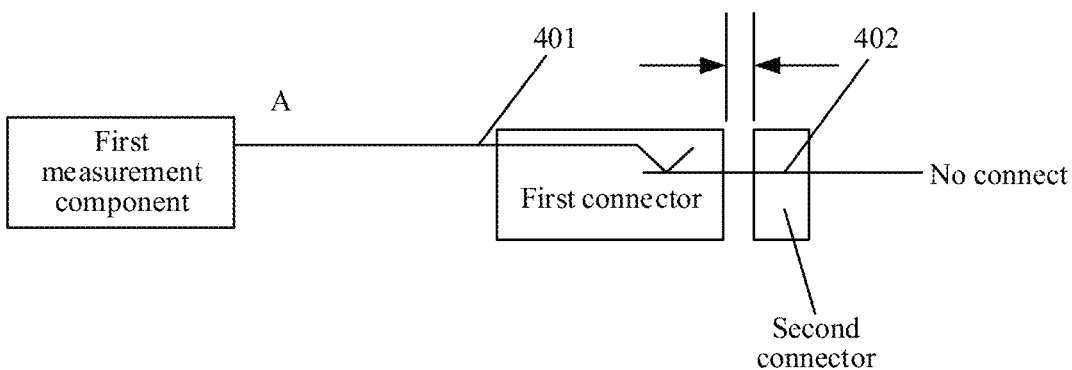
FIG. 4 is a schematic diagram of cabling of a measurement signal according to an embodiment of this disclosure.

For example, FIG. 4 is a schematic diagram of cabling of a measurement signal according to an embodiment of this disclosure. Referring to FIG. 4, 401 is a first signal cable, and 402 is a second signal cable. In FIG. 4, a first measurement component is connected to a first connector by using the first signal cable, and the first signal cable is further configured to connect to one end of the second signal cable configured on a second connector. No connect (NC) processing is performed on the other end of the second signal cable. Therefore, the measurement signal is reflected after the measurement signal arrives at the second connector. Optionally, the NC processing on the second signal cable is grounding the other end of the second signal cable.

Cabling layout 2: A third signal cable and a fifth signal cable are configured on the first line card, and the third signal cable is configured to separately connect to the first measurement component and the first connector, and is further configured to connect to a fourth signal cable configured on the second connector; and the fifth signal cable is configured to connect the first measurement component to the first connector, and is further configured to connect to a sixth signal cable configured on the second connector, and the sixth signal cable is further connected to the fourth signal cable.

Optionally, the description of the connection between the third signal cable and the first connector is similar to the description of the connection between the first signal cable and the first connector in the cabling layout 1, and the description of the connection between the third signal cable and the second connector is similar to the description of the connection between the first signal cable and the second connector in the cabling layout 1. The description of the connection between the fifth signal cable and the first connector is similar to the description of the connection between the first signal cable and the first connector in the cabling layout 1, and the description of the connection between the fifth signal cable and the second connector is similar to the description of the connection between the first signal cable and the second connector in the cabling layout 1. Details are not described herein again.

Figure 5:
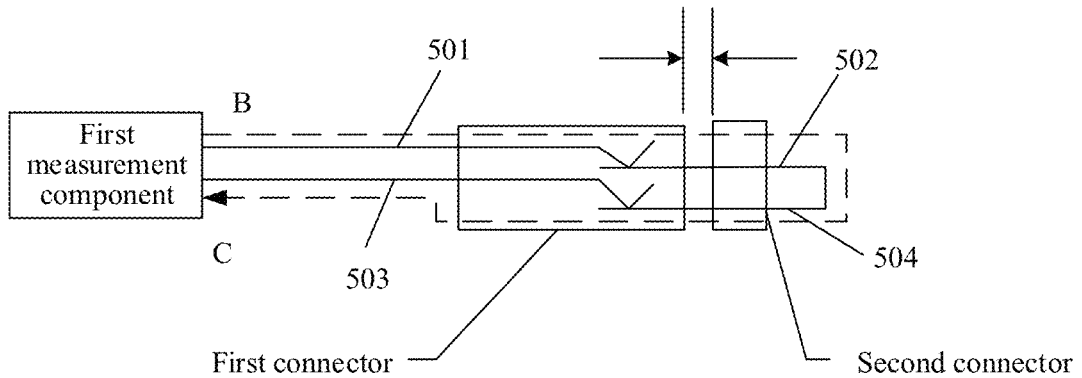
FIG. 5 is another schematic diagram of cabling of a measurement signal according to an embodiment of this disclosure.

For example, FIG. 5 is another schematic diagram of cabling of a measurement signal according to an embodiment of this disclosure. Referring to FIG. 5, 501 is a third signal cable, 502 is a fourth signal cable, 503 is a fifth signal cable, and 504 is a sixth signal cable. In FIG. 5, a first measurement component is connected to a first connector by using the third signal cable, and the third signal cable is further configured to connect to the fourth signal cable configured on a second connector. In addition, as shown in FIG. 5, the fifth signal cable is further configured on a first line card, and the fifth signal cable is configured to connect the first measurement component to the first connector, and is connected to the sixth signal cable configured on the second connector. Optionally, the third signal cable is configured to send a measurement signal, and the fourth signal cable, the fifth signal cable, and the sixth signal cable are configured to transmit the measurement signal from the second connector to the first measurement component.

Figure 6:
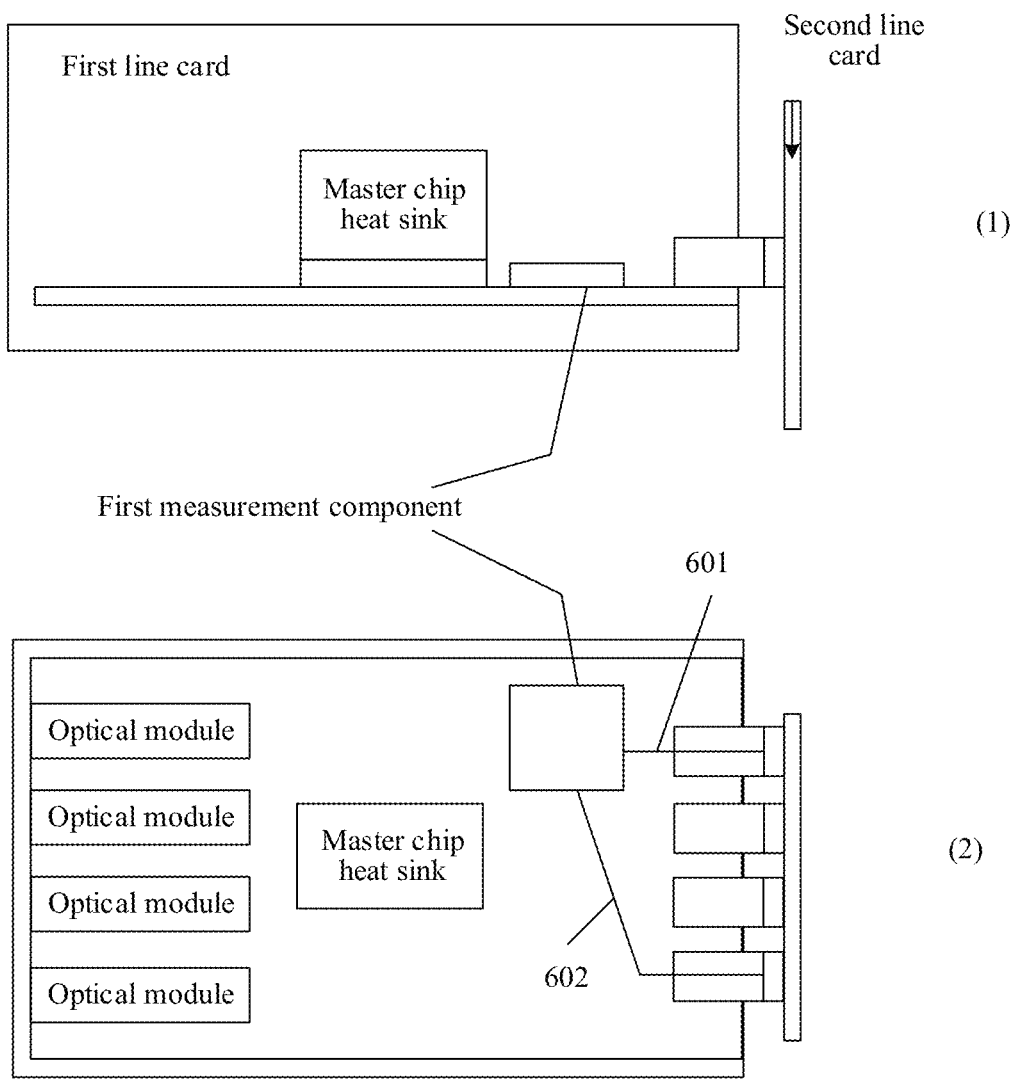
FIG. 6 is a schematic diagram of a connection between a first line card and a second line card according to an embodiment of this disclosure.

It should be noted that the third signal cable and the fifth signal cable may be located on one connector (the first connector), as shown in FIG. 5. When the first line card includes a plurality of connectors, the third signal cable and the fifth signal cable may alternatively be separately located on different connectors. In this case, the fourth signal cable connected to the third signal cable and the sixth signal cable connected to the fifth signal cable are also located on two different connectors on the second line card. For example, FIG. 6 is a schematic diagram of a connection between a first line card and a second line card according to an embodiment of this disclosure. (1) in FIG. 6 is a left view when the first line card is connected to the second line card, and (2) in FIG. 6 is a top view when the first line card is connected to the second line card. Referring to FIG. 6, a third signal cable 601 and a fifth signal cable 602 are separately located on different connectors. In addition to a first measurement component, an optical module and a master chip heat sink are further configured on the first line card. Optionally, the optical module is configured to convert between an optical signal and an electrical signal, and the master chip heat sink is configured to reduce heat of a chip. The first measurement component sends a measurement signal to a second connector by using the third signal cable 601, and then receives the measurement signal based on the fifth signal cable 602.

It should be noted that the cabling layout 1 and the cabling layout 2 are merely layout examples used to implement this disclosure. There may be another cabling layout manner between the first measurement component, the first connector, and the second connector. This is not limited in this embodiment of this disclosure. Regardless of a cabling layout used between the first measurement component, the first connector, and the second connector, the first measurement component may send the measurement signal to the second connector based on the signal cable.

The cabling layout 1 is used as an example. In this case, the first measurement component sends the measurement signal to the second connector by using the first signal cable configured on the first line card. Optionally, the measurement signal sent by the first measurement component is an electrical signal, and the electrical signal is transmitted to the second connector by using the first signal cable. The cabling layout 2 is used as an example. The first measurement component sends the measurement signal to the second connector by using the third signal cable configured on the first line card. Optionally, the measurement signal sent by the first measurement component is an electrical signal.

S202: The second connector receives the measurement signal sent by the first measurement component on the first line card.

For example, for the cabling layout 1 in S201, the second connector receives, by using a second signal cable configured on the second connector, the measurement signal sent by the first measurement component, where the second signal cable is configured to connect to a first signal cable configured on the first connector, and the first signal cable is configured to separately connect to the first measurement component and the first connector.

For the cabling layout 2 in S201, the second connector receives, by using a fourth signal cable configured on the second connector, the measurement signal sent by the first measurement component, where the fourth signal cable is configured to connect to a third signal cable configured on the first connector, and the third signal cable is configured to separately connect to the first measurement component and the first connector. Certainly, in addition to the foregoing two receiving manners, the second connector may further receive the measurement signal in another manner. This is not limited in this embodiment of this disclosure.

S203: The second connector sends a response result of the measurement signal to the first measurement component.

Optionally, the second connector sends a response result of the measurement signal to the first measurement component, to enable the first measurement component to determine a distance between the second connector and the first connector based on the measurement signal. The response result sent by the second connector to the first measurement component is not limited in this embodiment of this disclosure. Based on different cabling layouts of the second connector, there are different cases, including but not limited to the following several cases.

Response result 1: The response result is a reflected signal of the measurement signal.

The response result 1 is a response to the measurement signal received based on the signal cable of the cabling layout 1 in S201. In this case, the second connector sends the reflected signal to the first measurement component by using the second signal cable. Optionally, the reflected signal is sent to the first measurement component by using a time domain reflectometry (TDR) technology. The measurement signal is reflected by performing NC processing on the second signal cable on the second connector. A manner of NC processing is not limited in this embodiment of this disclosure, and the other end of the second signal cable may be grounded, or another manner may be used. A reflection status of the measurement signal varies according to different NC processing manners for the second signal cable. The measurement signal may be completely reflected, or may be partially reflected. Regardless of a reflection status of the measurement signal, a subsequent operation may be performed based on the reflected signal of the measurement signal.

Response result 2: The response result is the measurement signal.

The response result 2 is a response to the measurement signal received based on the signal cable of the cabling layout 2 in S201. In this case, the second connector sends the measurement signal to the first measurement component by using a sixth signal cable configured on the second connector, where the sixth signal cable is configured to connect to the fourth signal cable, and is further configured to connect to a fifth signal cable configured on the first connector, and the fifth signal cable is configured to connect the first measurement component to the first connector. A loop is formed between the first measurement component and the second connector by using the third signal cable, the fourth signal cable, the fifth signal cable, and the sixth signal cable, so that the measurement signal is sent by the first measurement component based on the loop and then returned to the first measurement component. In an embodiment, a location (a point B in FIG. 5) at which the third signal cable is connected to the first measurement component is different from a location (a point C in FIG. 5) at which the fifth signal cable is connected to the first measurement component. Certainly, a location at which the third signal cable is connected to the first measurement component may alternatively be the same as a location at which the fifth signal cable is connected to the first measurement component. This is not limited in this embodiment of this disclosure.

It should be noted that the foregoing example is intended to indicate that response results of the second connector are different when cabling layouts are different. The response result of the second connector is not limited. For example, the response result of the second connector may alternatively be a response signal. For example, a second measurement component is configured on the second connector, and the second measurement component is configured to: after receiving the measurement signal sent by the first measurement component, send a response signal to the first measurement component as a response result.

An occasion for sending the response signal by the second measurement component is not limited in this embodiment of this disclosure. The second measurement component may immediately send the response signal to the first measurement component after it is detected that the second measurement component receives the measurement signal. Alternatively, after it is detected that the second measurement component receives the measurement signal, the second measurement component sends the response signal to the first measurement component at an interval of a specific time. The specific time may be a value that is in any unit and magnitude and that is set based on experience. A time used by the first measurement component to calculate the distance (a time used by the first measurement component to send the measurement signal and receive the response result) is prolonged by using the interval of the specific time. By prolonging the time used to calculate the distance, difficulty in obtaining the time by the first measurement component is reduced.

A sending path of the response signal may be a sending path of the reflected signal in the response result 1, that is, transmitted by using the second signal cable, or may be a sending path of the measurement signal in the response result 2, that is, transmitted by using the sixth signal cable. Optionally, a location at which the second measurement component is located on the second line card is not limited in this embodiment of this disclosure. Regardless of the location, the second measurement component may be connected to the second connector by using a signal cable.

S204: The first measurement component determines a distance between the first connector and the second connector based on the measurement signal.

In an embodiment, the first measurement component determines the distance between the first connector and the second connector based on the measurement signal and the response result of the measurement signal. For the plurality of response results shown in S203, determining manners corresponding to the plurality of response results include but are not limited to the following several determining manners.

Determining manner 1: The first measurement component receives a reflected signal of the measurement signal; and determines the distance between the first connector and the second connector based on the measurement signal and the reflected signal.

The determining manner 1 is applied to a disclosure scenario of the cabling layout 1. In this scenario, the first measurement component receives, by using the first signal cable, the reflected signal that is of the measurement signal and that is transmitted by using the second signal cable. A manner of determining the distance between the first connector and the second connector based on the measurement signal and the reflected signal is not limited in this embodiment of this disclosure, and the following two processing manners may be included.

Processing manner 1: Determine an amplitude of a target signal obtained by superimposing the measurement signal and the reflected signal, and determine the distance between the first connector and the second connector based on the amplitude.

In this processing manner 1, a time domain delay is converted into a level signal through sending of the measurement signal and superimposition of the reflected signal, and a peak-to-peak value of the signal is detected at a start end. The distance between the first connector and the second connector causes a change in a time of flight of a signal, and therefore the amplitude of the target signal obtained by superimposing the sent measurement signal and the received reflected signal changes. In an embodiment, superimposition of the measurement signal and the reflected signal is related to lengths of the first signal cable and the second signal cable. For example, lengths of the first signal cable and the second signal cable are lengths of $n+¼$ periods, n is a positive integer, the period is a transmission period of the measurement signal, and the transmission period is a time interval between two same signals in the measurement signal. In this length, when the measurement signal is on a rising edge, a reflected signal received at a same position is on a falling edge, and the measurement signal and the reflected signal whose edges are approximately aligned are superimposed, so that the measurement signal and the reflected signal are exactly canceled at an output pin of an integrated circuit (IC) after being superimposed, and a level at the output pin is 0.

It should be noted that the lengths of the first signal cable and the second signal cable need to be limited in the processing manner 1, and the lengths of the first signal cable and the second signal cable are related to the first measurement component. For example, the lengths of the first signal cable and the second signal cable are related to the transmission period of the measurement signal sent by the first measurement component, and the transmission period of the measurement signal is related to a transmission rate of the measurement signal. In addition, in consideration of factors such as a board material, a temperature, and chip discretization of a circuit board such as a PCB on the line card, a loopback signal of the circuit board may be added for calibration of the first measurement component, to measure a cabling delay of a determined length and correct a signal rate. Therefore, in a possible implementation, before the distance between the first connector and the second connector is determined in Manner 1, the first measurement component is further calibrated. Optionally, the first measurement component is calibrated based on a loopback signal of the circuit board.

For example, a loopback line for transmitting a loopback signal is configured on the first line card and the second line card, the loopback signal is sent, a loopback time of the loopback signal on the loopback line is obtained, and a loopback distance of the loopback signal is determined based on a length of the loopback line. A transmission rate of the loopback signal is calculated based on the loopback time and the loopback distance of the loopback signal, and the transmission rate of the measurement signal is calibrated based on the transmission rate of the loopback signal, thereby reducing an error caused by a transmission medium in a transmission process of the measurement signal, to calibrate a parameter of the first measurement component, that is, the transmission rate of the measurement signal sent by the first measurement component. Optionally, the period for sending the measurement signal is determined based on the calibrated transmission rate of the measurement signal. A manner of sending the loopback signal is similar to a manner of sending the measurement signal, and details are not described herein again. The length of the loopback line may be obtained through setting when the loopback signal is added. This is not limited in this embodiment of this disclosure.

When the foregoing limited lengths of the first signal cable and the second signal cable do not include the distance between the first connector and the second connector, that is, when the distance between the first connector and the second connector is 0, the level at the output pin is 0. Therefore, when the distance between the first connector and the second connector starts to increase from 0, the measurement signal and the reflected signal cannot be canceled as the distance increases. For example, when the distance between the first connector and the second connector increases to 1.6 mm, the sent signal and the reflected signal cannot be canceled, and the amplitude of the target signal obtained through superimposition increases as the distance increases. The target signal at the output pin is converted from a time domain signal into an amplitude domain signal, and the distance between the first connector and the second connector is determined based on a peak value of the converted target signal. Optionally, the distance between the first line card and the second line card is determined through analog-to-digital conversion (AD) sampling and based on the peak value of the converted target signal.

Figure 7:
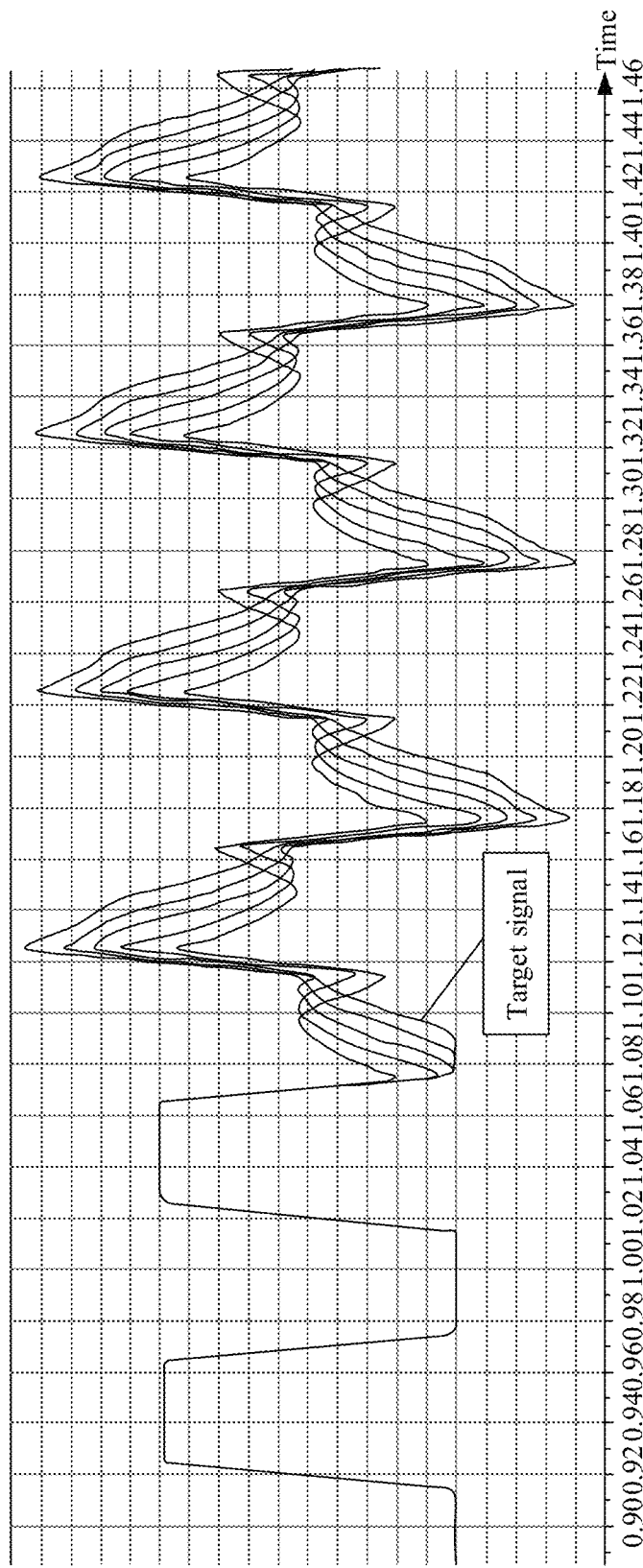
FIG. 7 is a waveform graph according to an embodiment of this disclosure.
Figure 8:
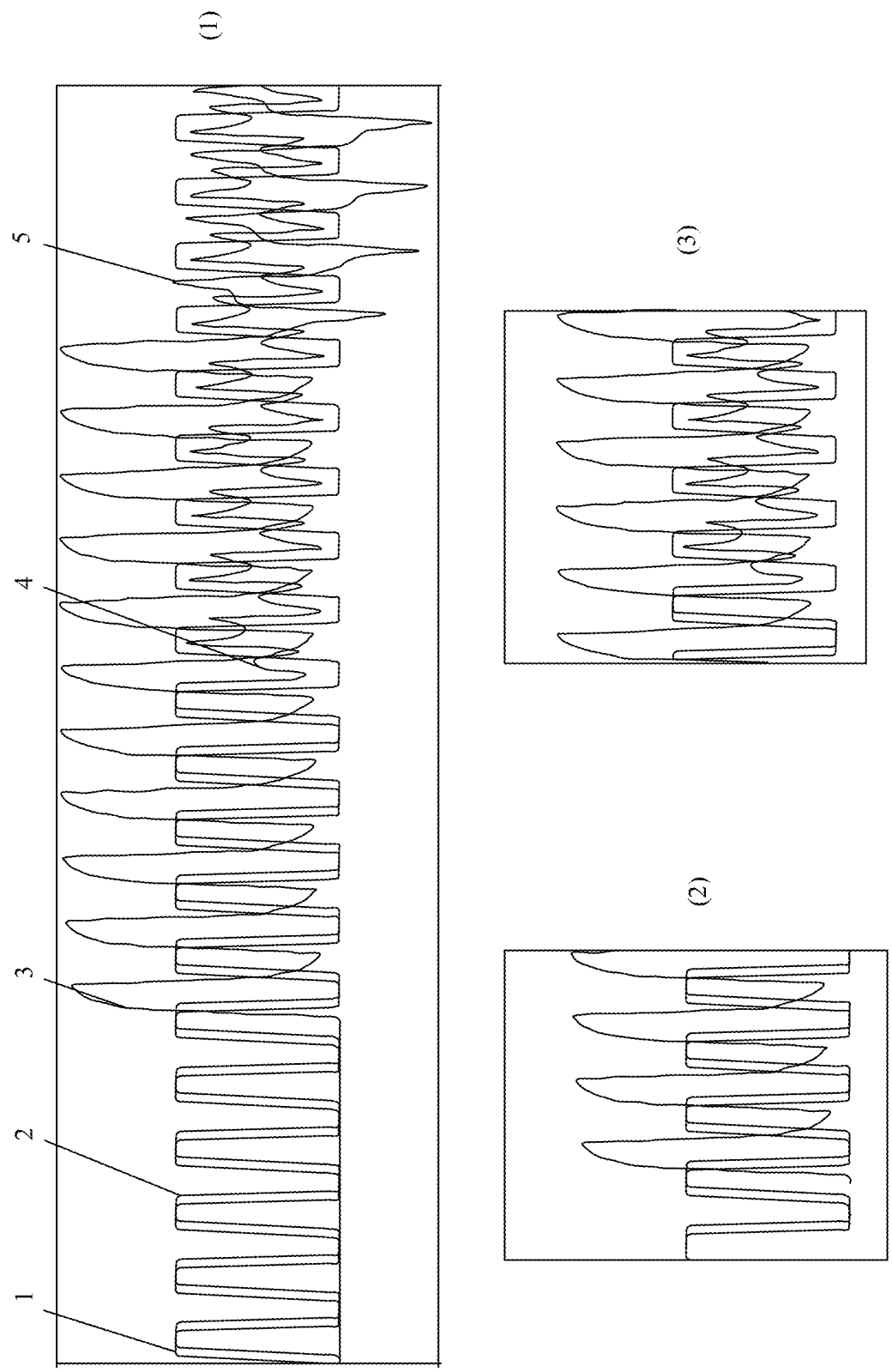
FIG. 8 is another waveform graph according to an embodiment of this disclosure.

For example, FIG. 7 is a waveform graph according to an embodiment of this disclosure. Waveforms in FIG. 7 reflect signal waveforms at different times at an output pin, and the output pin is a point A (a location at which the first signal cable is connected to the first measurement component) in the cabling layout diagram shown in FIG. 4. In the waveform graph shown in FIG. 7, a horizontal coordinate represents a time, and a vertical coordinate represents an amplitude. Different waveforms correspond to signals at the point A at different distances between the first connector and the second connector. As shown in FIG. 7, when distances between the first connector and the second connector are different, peak values of the target signal are also different. FIG. 8 is another waveform graph according to this disclosure. In three waveform graphs in FIG. 8, all horizontal coordinates are times, and all vertical coordinates are amplitudes. A waveform of a signal in (1) in FIG. 8 changes for five times corresponding to five moments. At a moment 1, a bump of the first measurement component starts to output a measurement signal. At a moment 2, a packaged pin of the first measurement component starts to output the measurement signal. At a moment 3, the measurement signal is subject to NC on the second connector. At a moment 4, the measurement signal and the reflected signal start to be superimposed. At a moment 5, the measurement signal and the reflected signal have been superimposed. (2) in FIG. 8 is a waveform graph at the moment 3, and reflects a waveform of a signal at the point A in FIG. 4 transmitted to the second connector. (3) in FIG. 8 is a waveform graph at the moment 4, and reflects a waveform of the target signal.

Optionally, the measurement signal is a high-frequency clock signal, whose frequency is, for example, 10 gigahertz (GHz). In an embodiment, when the measurement signal is at 10-giga (G) 500 millivolts (mV), a correspondence between a distance between the first connector and the second connector and a peak value of the target signal is shown in Table 1.

TABLE 1

| Distance (mm) | Peak value (Volt, V) |
| --- | --- |
| 0 | 0.414 |
| 0.5 | 0.601 |
| 1 | 0.692 |
| 1.5 | 0.783 |
| 2 | 0.908 |

Figure 9:
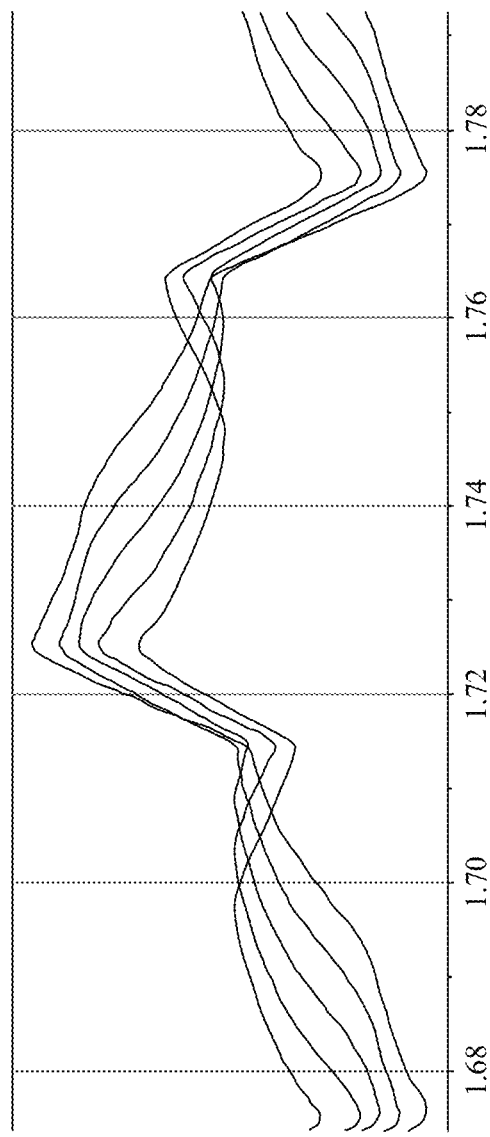
FIG. 9 is another waveform graph according to an embodiment of this disclosure.

The distance in Table 1 is used to represent a distance between the first connector and the second connector, and the peak value is used to represent a peak value of the target signal. Referring to Table 1, when the distance between the first connector and the second connector is 0 mm, the peak value of the target signal is 0.414 V. Other correspondences are similar, and details are not described herein again. For example, FIG. 9 is a waveform graph corresponding to Table 1 according to an embodiment of this disclosure. In FIG. 9, a horizontal coordinate represents a time, a vertical coordinate represents an amplitude, and different waveforms correspond to different distances between the first connector and the second connector.

It should be noted that the foregoing example is intended to describe a process of calculating the distance between the first connector and the second connector by superimposing the measurement signal and the reflected signal. The lengths of the first signal cable and the second signal cable are not limited. The lengths of the first signal cable and the second signal cable may be the lengths of the n+¼ periods shown in the foregoing embodiment, or may be other specific lengths. This is not limited in this embodiment of this disclosure.

Processing manner 2: Determine, based on a reflective edge of the reflected signal, a transmission time for transmitting the measurement signal; and determine the distance between the first connector and the second connector based on the transmission time of the measurement signal and a transmission rate of the measurement signal.

Optionally, in an disclosure scenario based on the cabling layout 1, the transmission distance of the measurement signal is a distance through which the measurement signal passes from leaving the first measurement component to arriving at the second connector, and the transmission time of the measurement signal is also a time for passing through the transmission distance. A reflection start time is determined based on a reflection edge of the received reflected signal, that is, a first time at which the measurement signal arrives at the second connector. A second time at which the first measurement component sends the measurement signal is determined based on a rising edge of the measurement signal. A transmission time of the measurement signal from leaving the first measurement component to arriving at the second connector is determined based on the first time and the second time. The reflection edge of the reflected signal may be a falling edge or a rising edge. This is not limited in this embodiment of this disclosure.

Figure 10:
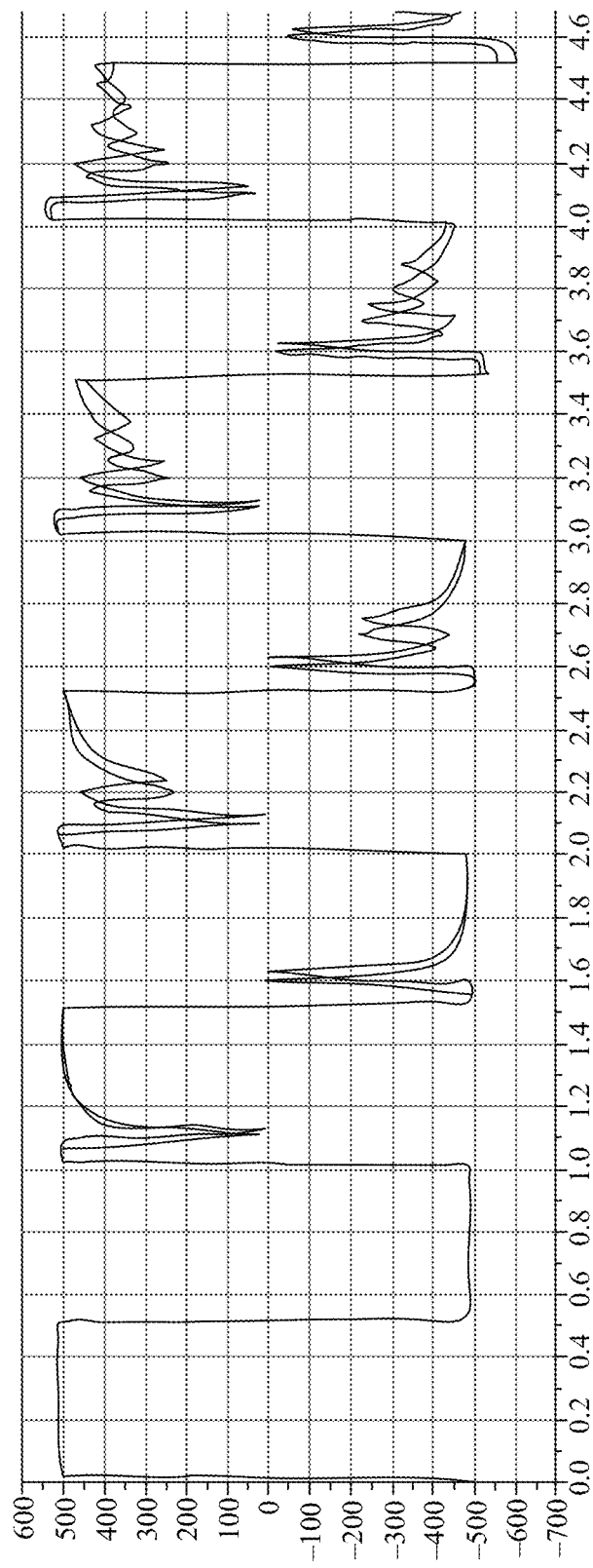
FIG. 10 is another waveform graph according to an embodiment of this disclosure.

FIG. 10 is another waveform graph according to an embodiment of this disclosure, and reflects a waveform graph at the point A in the cabling layout shown in FIG. 4. A horizontal coordinate represents a time, and a vertical coordinate represents a voltage (mV). Different waveforms correspond to different distances between the first connector and the second connector. A measurement device may obtain a first time and a second time by using the waveform graph, and determine a time difference between the first time and the second time as the transmission time of the measurement signal.

Optionally, in addition to obtaining the transmission time of the measurement signal, the first measurement component further obtains the transmission rate of the measurement signal. When the measurement signal is an electrical signal, the transmission rate of the measurement signal is determined based on a rate of the electrical signal in a vacuum and a relative dielectric constant of a material around a signal cable. A calculation formula is $V=C/Er^{0.5}$, where V represents a transmission rate, C represents a rate of an electrical signal in a vacuum, and Er represents a relative dielectric constant of a material around a signal cable. Optionally, $C=2.998 \times 10^8$ meters/second (m/s). When the material around the signal cable is a material with a flame retardant material grade code (flame retardant 4, Fr4), Er is in an interval of 4.2 to 4.5. In this case, a transmission rate of the measurement signal is approximately 6 inches/nanosecond (inch/ns).

In an embodiment, after calculating the transmission rate of the measurement signal, the first measurement component further calibrates the transmission rate, so that a distance value calculated based on the calibrated transmission rate is more accurate. A manner of calibrating the transmission rate is similar to the manner of calibrating the first measurement component based on the loopback signal shown in the processing manner 1, and details are not described herein again. The transmission rate of the measurement signal is calibrated, so that impact of factors such as temperatures of the first line card and the second line card and chip discretization on the transmission rate of the measurement signal is considered for the calibrated transmission rate, and accuracy is high.

It should be noted that the transmission time of the measurement signal reflects a time of the measurement signal from leaving the first measurement component to arriving at the second connector. Therefore, the distance calculated based on the transmission time and the transmission rate of the measurement signal is the distance between the first measurement component and the second connector. The first measurement component further needs to obtain the length of the first signal cable and the length of the second signal cable, to calculate the distance between the first connector and the second connector. Optionally, a process of obtaining the lengths of the first signal cable and the second signal cable is similar to the process of obtaining the length of the loopback line in the processing manner 1, and details are not described herein again.

Determining manner 2: The first measurement component receives the measurement signal; and determines the distance between the first connector and the second connector based on a transmission time and a transmission rate of the measurement signal.

Figure 11:
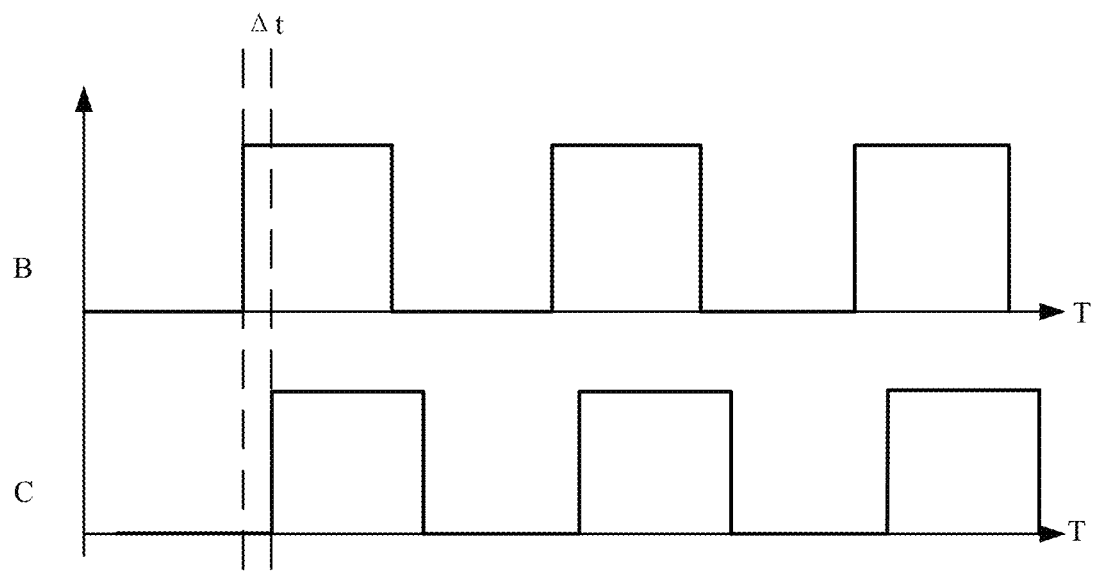
FIG. 11 is another waveform graph according to an embodiment of this disclosure.

The determining manner 2 is applied to an disclosure scenario of the cabling layout 2. In this case, the response result received by the first measurement component is the measurement signal. In this disclosure scenario, the receiving, by the first measurement component, the measurement signal includes: receiving, by the first measurement component, the measurement signal by using a fifth signal cable. In this case, the transmission distance of the measurement signal is a distance through which the measurement signal passes from leaving the first measurement component to returning to the first measurement component, and the transmission time of the measurement signal is also a time for passing through the transmission distance. The first measurement component may determine the transmission time of the measurement signal based on the sending time and the receiving time of the measurement signal. Optionally, in the cabling layout shown in FIG. 5, statistics about a status of sending a measurement signal are collected at the point B, and statistics about a status of receiving the measurement signal are collected at the point C. The measurement signal leaves the first measurement component through the point B, and then returns to the first measurement component through the point C. Waveform graphs at the point B and the point C are shown in FIG. 11. In FIG. 11, a horizontal coordinate represents a time (T), and a vertical coordinate represents a level. A sending time of the measurement signal is determined based on a rising edge of the measurement signal at the point B, a receiving time of the measurement signal is determined based on a rising edge of the measurement signal at the point C, and a time difference (Δt) between the sending time and the receiving time is calculated as a transmission time of the measurement signal. Certainly, signal edges used to determine the sending time and the receiving time may be rising edges shown in FIG. 11, or may be falling edges. This is not limited in this embodiment of this disclosure.

Figure 12:
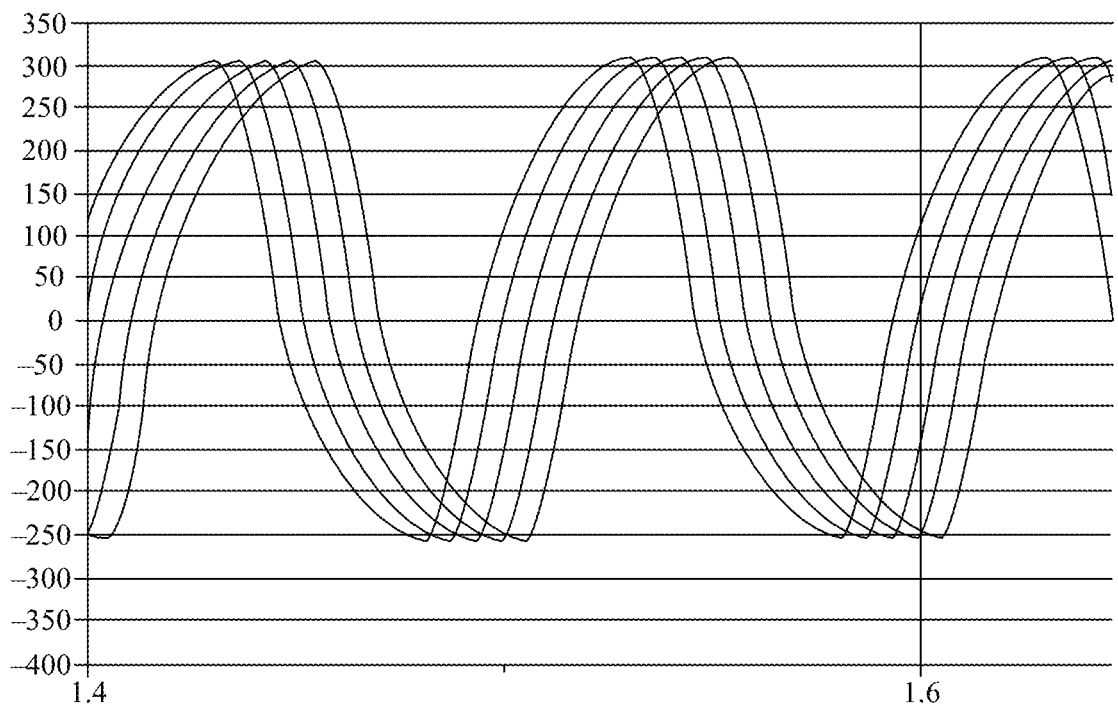
FIG. 12 is another waveform graph according to an embodiment of this disclosure.

A manner of obtaining the waveform graph of the measurement signal is not limited in this embodiment of this disclosure. The measurement signal may be converted from an analog signal into a digital signal based on sampling performed by a high-speed analog-to-digital converter (ADC) or a comparator, and then statistics about a waveform graph in a digital signal state are collected. Optionally, FIG. 12 is a waveform graph according to an embodiment of this disclosure. In FIG. 12, a horizontal coordinate is a time, and a vertical coordinate is a voltage. The waveform graph in FIG. 12 is a waveform graph of the measurement signal at the point C in FIG. 5. Different waveforms correspond to different distances between the first line card and the second line card. Five waveforms shown in FIG. 12 respectively correspond to distances 0 mm, 0.5 mm, 1 mm, 1.5 mm, and 2 mm between the first connector and the second connector. Optionally, the measurement signal at the point C is processed through sampling by using a comparator, so that the measurement signal is converted from the waveform shown in FIG. 12 to the waveform shown in FIG. 11.

In addition, when obtaining the transmission time of the measurement signal based on the cabling layout 2, the first measurement component may further prolong the transmission time of the measurement signal, thereby reducing difficulty in obtaining the transmission time. For example, the first measurement component determines, in response to that a quantity of times that the measurement signal passes through the first measurement component is not less than a repetition threshold, the transmission time of the measurement signal based on the sending time and the receiving time of the measurement signal. In the foregoing manner, a transmission process of the measurement signal is prolonged from originally sending the measurement signal from the first measurement component and transmitting the measurement signal to the first measurement component once based on the third signal cable, the fourth signal cable, the sixth signal cable, and the fifth signal cable, to controlling the measurement signal to be transmitted based on the third signal cable, the fourth signal cable, the sixth signal cable, and the fifth signal cable for a quantity of repetition times not less than the repetition threshold, thereby extending the transmission process of the measurement signal and prolonging the transmission time of the measurement signal. Optionally, the repetition threshold may be any integer greater than 1 that is set based on experience.

For example, the repetition threshold is 1000. When the measurement signal passes through the first measurement component for the 1000th time, because 1000 is equal to the repetition threshold, the first measurement component may receive the measurement signal, and determine the transmission time of the measurement signal based on the sending time and the receiving time of the measurement signal. The transmission time for 1000 times of transmission is 1 s. Optionally, the first measurement component may determine, based on the prolonged transmission time and the repetition threshold, a transmission time for transmitting the measurement signal once, to improve accuracy of the obtained transmission time. For example, 1 s divided by 1000 is 1 ms. Then, the distance between the first connector and the second connector is determined based on the transmission time and the transmission rate. Optionally, the first measurement component may further calculate the transmission distance of the measurement signal based on the prolonged transmission time and the transmission rate of the measurement signal, and then calculate the distance between the first connector and the second connector based on the transmission distance and the repetition threshold. For a process of determining the transmission distance based on the transmission time and the transmission rate, refer to the following embodiments. Details are not described herein again.

After the transmission time of the measurement signal is obtained, the transmission rate of the measurement signal is further obtained, and the distance between the first connector and the second connector is determined based on the transmission time and the transmission rate. A process of obtaining the transmission rate of the measurement signal includes determining the transmission rate of the measurement signal based on a rate of an electrical signal in a vacuum and a relative dielectric constant of a material around a signal cable. A process of determining the transmission rate of the measurement signal is similar to a process of obtaining the transmission rate of the measurement signal in the processing manner 2 in the determining manner 1. For example, the first measurement component may further calibrate the first measurement component based on a loopback signal of a circuit board, and obtain a more accurate transmission rate of the measurement signal through calibration. The circuit board is a circuit board on which the first measurement component and the first connector are located. A process of calibrating the first measurement component is similar to the process of calibrating the first measurement component in the processing manner 1 in the determining manner 1, and details are not described herein again. Optionally, regardless of whether the transmission rate is calibrated, the distance between the first connector and the second connector may be determined based on the transmission rate and the transmission time. A process of determining the distance between the first connector and the second connector based on the transmission time and the transmission rate is similar to the process of determining the distance between the first connector and the second connector based on the transmission time and the transmission rate in the processing manner 2 in the determining manner 1. Details are not described herein again.

Certainly, the first measurement component may choose to calculate the distance between the first connector and the second connector based on the transmission rate, or may choose to calculate a cabling delay of the measurement signal based on the transmission rate, and calculate the distance between the first connector and the second connector based on the cabling delay. The cabling delay is generated because a transmission rate of the measurement signal at an inner layer of the signal cable is lower than that at a surface layer of the signal cable. For example, if the transmission rate of the measurement signal is 6 inches/ns, the cabling delay of the measurement signal is 166 picoseconds (ps)/inch. For example, a formula for calculating the transmission distance based on the cabling delay and the transmission time is transmission time/cabling delay/2=transmission time/166 ps/inch/2.

For a case in which the response result is a response signal, a time difference between when the first measurement component sends the measurement signal to the second connector and when the first measurement component receives the response signal may be determined as a transmission time of the measurement signal, and then the distance between the first connector and the second connector is determined based on the transmission time and the transmission rate. A determining process is similar to the process of determining the distance between the first connector and the second connector based on the time at which the reflected signal is received in the processing manner 2 in the determining manner 1, and details are not described herein again.

Regardless of a manner in which the distance between the first line card and the second line card is determined, the first measurement component may perform corresponding operations based on the measured distance between the first connector and the second connector. The performed operations include but are not limited to the following two types.

Operation 1: In response to that the distance between the first connector and the second connector is greater than a connection threshold, trigger a connection alarm, where the connection alarm is used to prompt that a connection of the first line card is abnormal.

Optionally, the connection threshold is a demating. A manner in which the first measurement component determines that the distance between the first connector and the second connector is greater than the connection threshold may be calculating the distance, and then comparing values of the distance and the connection threshold. Optionally, the first measurement component may determine, based on a correspondence between a distance between the first connector and the second connector and a peak value, a target peak value corresponding to the demating, and determine, by comparing a measured peak value of the target signal with the target peak value, whether the distance between the first connector and the second connector is not greater than the demating. A manner of the connection alarm is not limited in this embodiment of this disclosure, and may be implemented based on an indicator, for example, blinking of an indicator, or may be implemented by sending an alarm command to a network management center. The connection alarm is triggered to prompt that the connection of the first line card is abnormal, so that a related person, for example, an assembly person, reconnects the first line card.

Operation 2: In response to an increase in the distance between the first connector and the second connector, perform an active/standby switching operation on the first wire board.

Optionally, the first measurement component may determine, by comparing distances between the first connector and the second connector, whether the distance between the first connector and the second connector is increasing. Optionally, the first measurement component may determine a change in the distance between the first connector and the second connector based on a change in the peak value of the target signal. For example, in response to an increase in the peak value of the target signal, it is determined that the distance between the first connector and the second connector is increasing. By detecting that the distance between the first line card and the second line card is increasing, the first measurement component determines that a related person is performing an operation of removing the first line card. In this case, active/standby switching is performed on the first line card, and a working state of the first line card is switched to an offline state, so that service running is not affected after the first line card is removed. The first line card can be removed and detected by using the measurement signal without an auxiliary detection apparatus such as a micro switch, thereby reducing costs.

In conclusion, according to the distance measurement method provided in this embodiment of this disclosure, the first measurement component sends the measurement signal to the second connector, to detect the distance between the first connector and the second connector based on the measurement signal. Therefore, not only flexibility is high, but also accuracy is higher. In addition, the first measurement component is located on the first line card, the distance between the first connector and the second connector can be measured by using the first measurement component, and no external test instrument or tooling is required. Therefore, universality of the distance measurement method is high, costs are low, and real-time detection can be implemented. In addition, based on the distance between the first connector and the second connector, different operations corresponding to different distances are further performed, to assist in service running when the first line card is connected to the second line card.

In an embodiment, a process of determining the distance between the first connector and the second connector based on the measurement signal is described by using the cabling layout shown in FIG. 5 as an example.

For example, the first measurement component sends the measurement signal to the second connector by using the third signal cable configured on the first line card. After receiving, by using the fourth signal cable configured on the second connector, the measurement signal sent by the first measurement component, the second connector sends the measurement signal to the first measurement component by using the sixth signal cable connected to the fourth signal cable, where the measurement signal is used as the response result. Optionally, the first measurement component receives the measurement signal by using the fifth signal cable connected to the sixth signal cable. In this case, a transmission path of the measurement signal is a dashed line part shown in FIG. 5.

The first measurement component sends and receives the measurement signal, determines a sending time of the measurement signal and a receiving time of the measurement signal based on waveform graphs at the point B and the point C, and determines a transmission time of the measurement signal based on a time difference between the sending time and the receiving time.

Optionally, the first measurement component obtains the transmission rate of the measurement signal, and calibrates the transmission rate. A process of obtaining the transmission rate of the measurement signal is similar to the process of obtaining the transmission rate of the measurement signal in the determining manner 2 in S204, and a process of calibrating transmission is similar to the process of calibrating the transmission rate in the determining manner 2 in S204. Details are not described herein again.

The transmission distance of the measurement signal is calculated by using the transmission time of the measurement signal and the calibrated transmission rate. Because the calculated transmission distance is a distance through which the measurement signal passes from leaving the first measurement component to returning to the first measurement component, the transmission distance needs to be divided by 2. In addition, the distance between the first connector and the second connector is obtained by subtracting lengths of signal cables through which the measurement signal passes, that is, the lengths of the third signal cable, the fourth signal cable, the fifth signal cable, and the sixth signal cable from the transmission distance divided by 2.

Figure 13:
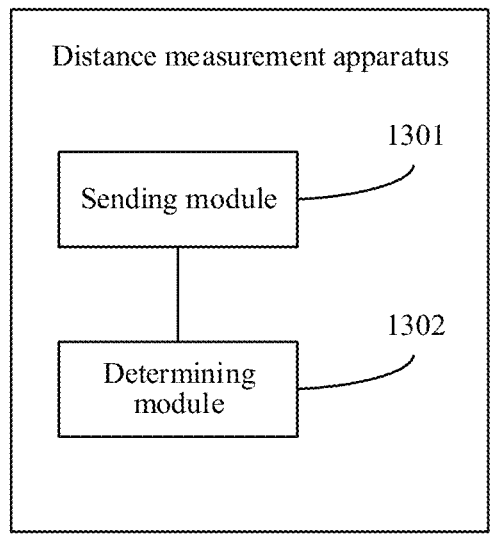
FIG. 13 is a schematic structural diagram of a distance measurement apparatus according to an embodiment of this disclosure.

The foregoing describes the distance measurement method in embodiments of this disclosure. Corresponding to the foregoing method, an embodiment of this disclosure further provides a distance measurement apparatus. FIG. 13 is a schematic structural diagram of a distance measurement apparatus according to an embodiment of this disclosure. Based on the following plurality of modules shown in FIG. 13, the distance measurement apparatus shown in FIG. 13 can perform all or some of the operations shown in FIG. 3. It should be understood that the apparatus may include more additional modules than the shown modules or omit some of the shown modules. This is not limited in this embodiment of this disclosure. As shown in FIG. 13, the apparatus is applied to a first measurement component on a first line card, a first connector is further configured on the first line card, the first connector is configured to connect to a second connector configured on a second line card, and the apparatus includes:

a sending module 1301, configured to send a measurement signal to the second connector by using the first connector; and a determining module 1302, configured to determine a distance between the first connector and the second connector based on the measurement signal.

In an embodiment, the determining module 1302 is configured to: receive a reflected signal of the measurement signal; and determine the distance between the first connector and the second connector based on the measurement signal and the reflected signal.

In an embodiment, the sending module 1301 is configured to send the measurement signal to the second connector by using a first signal cable configured on the first line card, where the first signal cable is configured to separately connect to the first measurement component and the first connector, and is further configured to connect to a second signal cable configured on the second connector; and the determining module 1302 is configured to receive, by using the first signal cable, the reflected signal that is of the measurement signal and that is transmitted by using the second signal cable.

In an embodiment, lengths of the first signal cable and the second signal cable are lengths of n+¼ periods, n is a positive integer, and the period is a transmission period of the measurement signal; and the determining module 1302 is configured to determine an amplitude of a target signal obtained by superimposing the measurement signal and the reflected signal, and determining the distance between the first connector and the second connector based on the amplitude.

In an embodiment, the determining module 1302 is configured to: determine, based on a reflective edge of the reflected signal, a transmission time for transmitting the measurement signal; and determine the distance between the first connector and the second connector based on the transmission time and a transmission rate of the measurement signal.

In an embodiment, the determining module 1302 is configured to: receive the measurement signal; and determine the distance between the first connector and the second connector based on a transmission time and a transmission rate of the measurement signal.

In an embodiment, the sending module 1301 is configured to send the measurement signal to the second connector by using a third signal cable configured on the first line card, where the third signal cable is configured to separately connect to the first measurement component and the first connector, and is further configured to connect to a fourth signal cable configured on the second connector; and the determining module 1302 is configured to receive the measurement signal by using a fifth signal cable, where the fifth signal cable is configured to connect the first measurement component to the first connector, and is further configured to connect to a sixth signal cable configured on the second connector, and the sixth signal cable is further connected to the fourth signal cable.

In an embodiment, the determining module 1302 is further configured to: determine a transmission time of the measurement signal based on a sending time and a receiving time of the measurement signal; and determine the transmission rate of the measurement signal based on a rate of an electrical signal in a vacuum and a relative dielectric constant of a material around a signal cable.

In an embodiment, the determining module 1302 is configured to determine, in response to that a quantity of times that the measurement signal passes through the first measurement component is not less than a repetition threshold, the transmission time of the measurement signal based on the sending time and the receiving time of the measurement signal.

In an embodiment, both the first measurement component and the first connector are located on a circuit board of the first line card, and the apparatus further includes:
 a calibration module, configured to calibrate the first measurement component based on a loopback signal of the circuit board.

In an embodiment, the first measurement component is located in a chip, the first line card is a board, and the second line card is a backplane.

In an embodiment, the measurement signal is an in-position signal, and the in-position signal is further used to detect a connection status between the first connector and the second connector; and the determining module 1302 is configured to determine, when determining, based on the in-position signal, that the connection status between the first connector and the second connector is connected, the distance between the first connector and the second connector based on the in-position signal.

In the foregoing apparatus, the first measurement component sends the measurement signal to the second connector, to detect the distance between the first connector and the second connector based on the measurement signal. Therefore, not only flexibility is high, but also accuracy is higher. In addition, the first measurement component is located on the first line card, the distance between the first connector and the second connector is measured by using the first measurement component, and no external test instrument or tooling is required. Therefore, universality is high, and real-time detection can be implemented.

Figure 14:
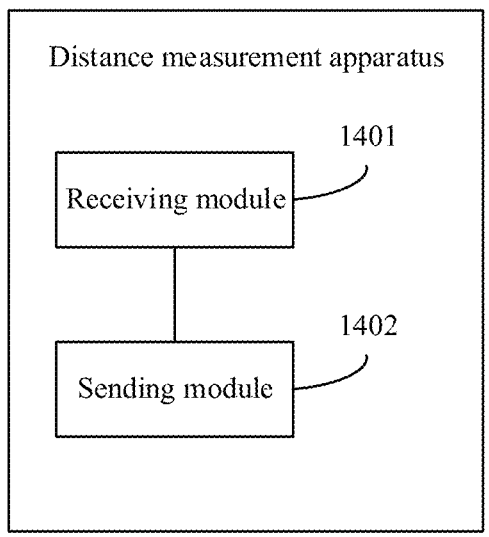
FIG. 14 is a schematic structural diagram of another distance measurement apparatus according to an embodiment of this disclosure.

FIG. 14 is a schematic structural diagram of a distance measurement apparatus according to an embodiment of this disclosure. Based on the following plurality of modules shown in FIG. 14, the distance measurement apparatus shown in FIG. 14 can perform all or some of the operations shown in FIG. 3. It should be understood that the apparatus may include more additional modules than the shown modules or omit some of the shown modules. This is not limited in this embodiment of this disclosure. As shown in FIG. 14, the apparatus is applied to a second connector configured on a second line card, the second connector is configured to connect to a first connector configured on a first line card, and the apparatus includes:
 a receiving module 1401, configured to receive a measurement signal sent by a first measurement component on the first line card; and
 a sending module 1402, configured to send a response result of the measurement signal to the first measurement component, to enable the first measurement component to determine a distance between the second connector and the first connector based on the measurement signal.

In an embodiment, the response result is a reflected signal of the measurement signal; the receiving module 1401 is configured to receive, by using a second signal cable configured on the second connector, the measurement signal sent by the first measurement component, where the second signal cable is configured to connect to a first signal cable configured on the first connector, and the first signal cable is configured to separately connect to the first measurement component and the first connector; and the sending module 1402 is configured to send the reflected signal to the first measurement component by using the second signal cable.

In an embodiment, the response result is the measurement signal; the receiving module 1401 is configured to receive, by using a fourth signal cable configured on the second connector, the measurement signal sent by the first measurement component, where the fourth signal cable is configured to connect to a third signal cable configured on the first connector, and the third signal cable is configured to separately connect to the first measurement component and the first connector; and the sending module 1402 is configured to send the measurement signal to the first measurement component by using a sixth signal cable configured on the second connector, where the sixth signal cable is configured to connect to the fourth signal cable, and is further configured to connect to a fifth signal cable configured on the first connector, and the fifth signal cable is configured to connect the first measurement component to the first connector.

In an embodiment, the first measurement component is located in a chip, the first line card is a board, and the second line card is a backplane.

In the foregoing apparatus, after receiving the measurement signal sent by the first measurement component, the second connector sends the response result of the measurement signal to the first measurement component. In this way, the first measurement component can determine the distance between the first connector and the second connector based on the measurement signal. Therefore, not only flexibility is high, but also accuracy is higher. In addition, the distance between the first connector and the second connector can be measured by using the second connector on the second line card and the first measurement component on the first line card, and no external test instrument or tooling is required. Therefore, universality is high, and real-time detection can be implemented.

It should be understood that, when the foregoing apparatus implements the functions of the apparatus, division into the foregoing functional modules is merely used as an example for description. During actual disclosure, the foregoing functions may be allocated to different functional modules for implementation based on a requirement. In other words, a device is divided into different functional modules in terms of an inner structure, to implement all or a part of the functions described above. In addition, the apparatus and method embodiments provided in the foregoing embodiments belong to the same conception. For the specific implementation process, reference may be made to the method embodiments, and details are not described herein again.

Figure 15:
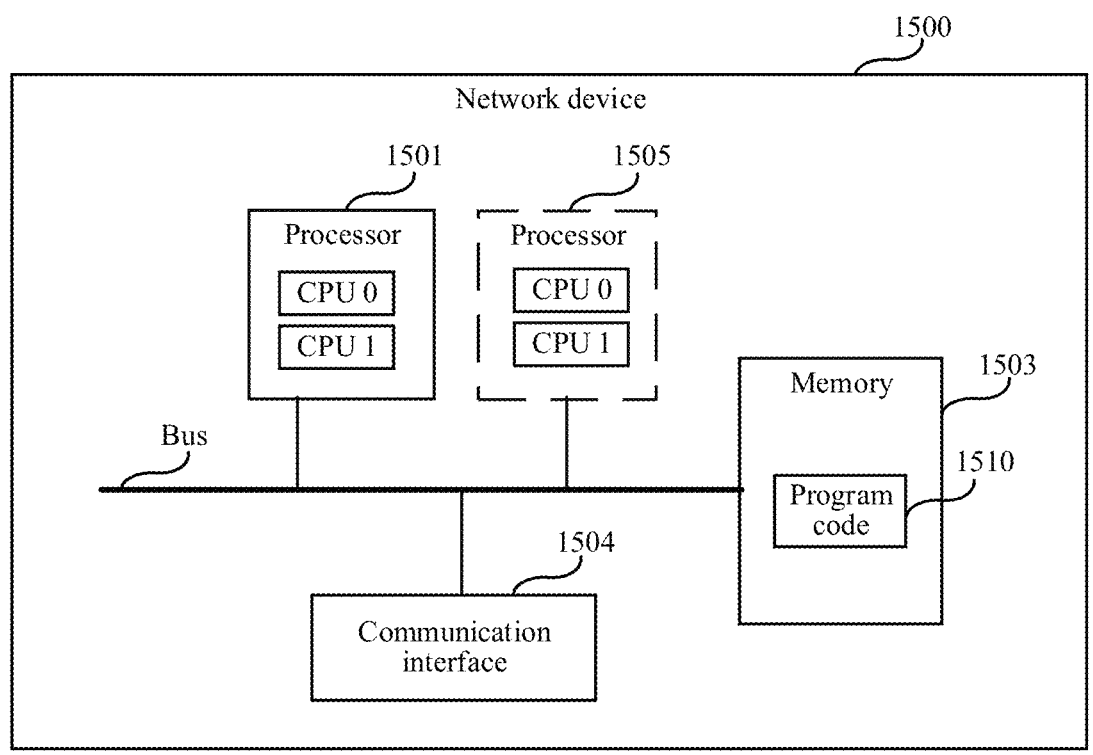
FIG. 15 is a schematic structural diagram of a network device according to an embodiment of this disclosure.

FIG. 15 is a schematic structural diagram of a network device 1500 according to an example embodiment of this disclosure. The network device 1500 shown in FIG. 15 includes a first line card. A first measurement component is configured on the first line card. The first measurement component is configured to perform operations related to the first measurement component in the distance measurement method shown in FIG. 3. The network device 1500 may further include a second line card. The second line card is configured to perform operations related to the second connector in the distance measurement method shown in FIG. 3. The network device 1500 may be, for example, a switch, a router, or the like. The network device 1500 may be implemented by using a general bus architecture.

As shown in FIG. 15, the network device 1500 includes at least one processor 1501, a memory 1503, and at least one communication interface 1504.

The processor 1501 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this disclosure. For example, the processor 1501 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable logic gate array (FPGA), a generic array logic (GAL), or any combination thereof. The processor may implement or execute various logical blocks, modules, and circuits described with reference to content disclosed in embodiments of the present invention. Alternatively, the processor may be a combination of processors implementing a computing function, for example, including a combination of one or more microprocessors, or a combination of a DSP and a microprocessor.

Optionally, the network device 1500 further includes a bus. The bus is configured to transmit information between components of the network device 1500. The bus may be a peripheral component interconnect (PCI) bus, an extended industry standard architecture (EISA) bus, or the like. The bus may be classified into an address bus, a data bus, a control bus, or the like. For ease of description, the bus in FIG. 15 is represented by using only one bold line, but which does not indicate that there is only one bus or one type of bus.

The memory 1503 is, for example, a read-only memory (ROM) or another type of static storage device that can store static information and instructions, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. The memory 1503 exists, for example, independently, and connects to the processor 1501 by using the bus. The memory 1503 may alternatively be integrated in the processor 1501.

The communication interface 1504 is any apparatus such as a transceiver, to communicate with another device or a communication network. The communication network may be the Ethernet, a radio access network (RAN), a wireless local area network (WLAN), or the like. The communication interface 1504 may include a wired communication interface, and may further include a wireless communication interface. Specifically, the communication interface 1504 may be an Ethernet interface, a Fast Ethernet (FE) interface, a Gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this disclosure, the communication interface 1504 may be configured for the network device 1500 to communicate with another device.

During specific implementation, in an embodiment, the processor 1501 may include one or more CPUs such as a CPU 0 and a CPU 1 shown in FIG. 15. Each of these processors may be a single-core (single-CPU) processor, or may be a multi-core (multi-CPU) processor. The processor herein may be one or more devices or circuits, and/or a processing core configured to process data (for example, a computer program instruction).

During specific implementation, in an embodiment, the network device 1500 may include a plurality of processors, for example, a processor 1501 and a processor 1505 shown in FIG. 15. Each of the processors may be a single-core processor (single-CPU) or may be a multi-core processor (multi-CPU). The processor herein may refer to one or more devices, circuits, and/or processing cores configured to process data (for example, computer program instructions).

During specific implementation, in an embodiment, the network device 1500 may further include an output device and an input device. The output device communicates with the processor 1501, and may display information in a plurality of manners. For example, the output device may be a liquid crystal display (LCD), a light emitting diode (LED) display device, a cathode ray tube (CRT) display device, a projector, or the like. The input device communicates with the processor 1501, and may receive a user input in a plurality of manners. For example, the input device may be a mouse, a keyboard, a touchscreen device, or a sensor device.

In some embodiments, the memory 1503 is configured to store program code 1510 for executing the solutions of this disclosure, and the processor 1501 may execute the program code 1510 stored in the memory 1503. The program code 1010 may include one or more software modules. Optionally, the processor 1501 may store program code or instructions for executing the solutions of this disclosure.

Figure 3:
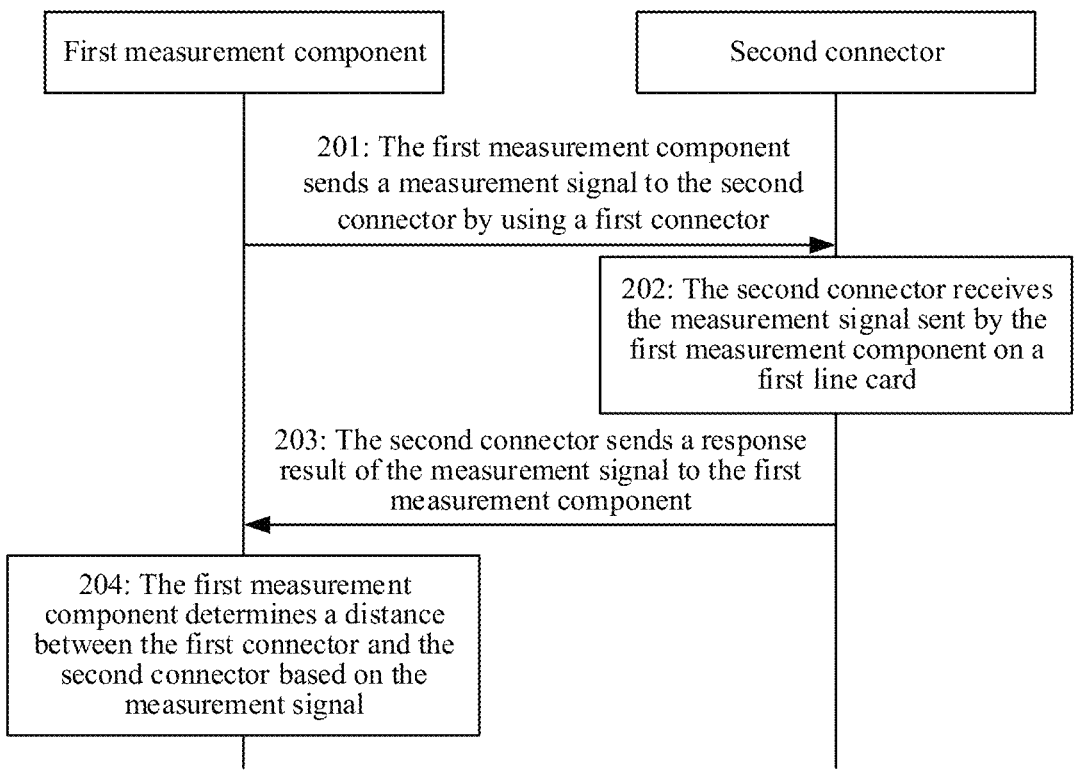
FIG. 3 is a flowchart of a distance detection method according to an embodiment of this disclosure.

Steps performed by the first measurement component in the distance measurement method shown in FIG. 3 are completed by using an integrated logic circuit of the first measurement component or an instruction in the form of software. Steps performed by the second connector in the distance measurement method shown in FIG. 3 are completed by using an integrated logic circuit of the second connector or an instruction in the form of software. The steps of the method disclosed with reference to embodiments of this disclosure may be directly performed by a hardware processor, or may be performed by a combination of hardware and software modules in the processor. The software module may be stored in a storage medium that is mature in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor. To avoid repetition, details are not described herein again.

Figure 16:
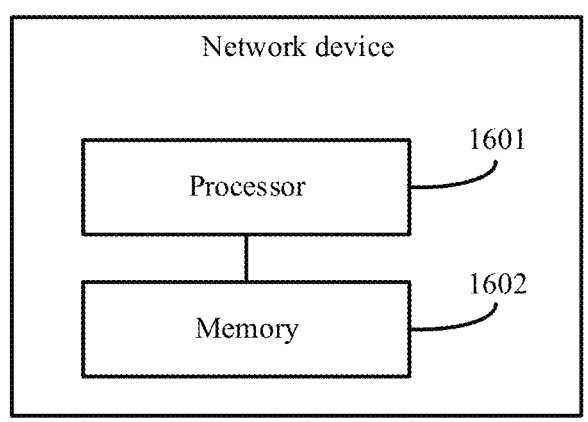
FIG. 16 is a schematic structural diagram of another network device according to an embodiment of this disclosure.

FIG. 16 is a schematic structural diagram of another network device according to an embodiment of this disclosure. The network device includes a first line card. A first measurement component is configured on the first line card. The first measurement component is configured to perform operations related to the first measurement component in the distance measurement method shown in FIG. 3. The network device may further include a second line card. The second line card is configured to perform operations related to the second connector in the distance measurement method shown in FIG. 3. For example, the network device is, for example, a server. The server may vary greatly due to different configurations or performance, and may include one or more processors (e.g. CPU) 1601 and one or more memories 1602. The one or more memories 1602 store at least one computer program, and the at least one computer program is loaded and executed by the one or more processors 1601. Certainly, the network device may further have components such as a wired or wireless network interface, a keyboard, and an input/output interface for inputting and outputting. The network device may further include other components for implementing device functions. Details are not described herein.

An embodiment of this disclosure further provides a communication apparatus. The apparatus includes a transceiver, a memory, and a processor. The transceiver, the memory, and the processor communicate with each other through internal connection path, the memory is configured to store instructions, the processor is configured to execute the instruction stored in the memory, to control the transceiver to receive a signal and control the transceiver to send a signal, and when the processor executes the instruction stored in the memory, the processor is enabled to perform a distance measurement method.

It should be understood that the processor may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, any conventional processor, or the like. It should be noted that the processor may be a processor that supports an advanced reduced instruction set computing machines (ARM) architecture.

Further, in an optional embodiment, the memory may include a read-only memory and a random access memory, and provide instructions and data for the processor. The memory may further include a nonvolatile random access memory. For example, the memory may further store device type information.

The memory may be a volatile memory or a nonvolatile memory, or include both a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random access memory (RAM), used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

An embodiment of this disclosure further provides a computer-readable storage medium. The storage medium stores at least one instruction, and the instruction is loaded and executed by a processor, to enable a computer to implement any one of the foregoing distance measurement methods.

An embodiment of this disclosure further provides a computer program (product). When the computer program is executed by a computer, a processor or the computer may be enabled to perform corresponding steps and/or procedures in the foregoing method embodiments.

An embodiment of this disclosure further provides a chip. The chip includes a processor, configured to invoke and run instructions stored in the memory, to enable a communication device in which the chip is installed to perform any one of the foregoing distance measurement methods.

An embodiment of this disclosure further provides another chip, including: an input interface, an output interface, a processor, and a memory. The input interface, the output interface, the processor, and the memory are connected to each other through an internal connection path. The processor is configured to execute code in the memory. When the code is executed, the processor is configured to perform any one of the foregoing distance measurement methods.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, all or some of the procedures or functions in this disclosure are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium (for example, a solid-state disk).

To clearly illustrate interchangeability between hardware and software, steps and compositions of each embodiment have been described above generally according to functions. Whether the functions are executed in a mode of hardware or software depends on particular disclosures and design constraint conditions of the technical solutions. A person of ordinary skill in the art may use different methods to implement the described functions for each particular disclosure, but it should not be considered that the implementation goes beyond the scope of this disclosure.

Computer program code used to implement the method in embodiments of this disclosure may be written in one or more programming languages. These computer program codes may be provided to a processor of a general-purpose computer, a special-purpose computer, or another programmable distance measurement apparatus, so that the program codes, when executed by the computer or another programmable distance measurement apparatus, cause the functions/operations specified in the flowchart and/or block diagram to be implemented. The program code may be executed all on a computer, partially on a computer, as an independent software package, partially on a computer and partially on a remote computer, or all on a remote computer or server.

In a context of embodiments of this disclosure, the computer program code or related data may be carried by any appropriate carrier, so that a device, an apparatus, or a processor can perform various processing and operations described above. Examples of the carriers include a signal, a computer-readable medium, and the like. Examples of the signal may include propagating signals in electrical, optical, radio, sound, or other forms, such as carrier waves and infrared signals.

It may be clearly understood by a person skilled in the art that, for the purpose of convenient and brief description, for a detailed working process of the foregoing system, device, and module, refer to a corresponding process in the foregoing method embodiment. Details are not described herein.

In the several embodiments provided in this disclosure, it should be understood that the disclosed system, device, and method may be implemented in other manners. For example, the described device embodiment is merely an example. For example, the module division is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented by using some interfaces. Indirect couplings or communication connections between the devices or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions in embodiments of this disclosure.

In addition, function modules in embodiments of this disclosure may be integrated into one processing module, or each of the modules may exist alone physically, or two or more modules may be integrated into one module. The integrated module may be implemented in a form of hardware, or may be implemented in a form of a software functional module.

In this disclosure, the terms "first", "second", and the like are used to distinguish between same or similar items whose effects and functions are basically the same. It should be understood that there is no logical or time-sequence dependency between "first", "second", and "$n^{th}$", and a quantity and an execution sequence are not limited. It should be further understood that although the terms such as "first" and "second" are used in the following descriptions to describe various elements, these elements should not be limited by the terms. These terms are merely used to distinguish one element from another element. For example, a first link may be referred to as a second link without departing from the scope of the various examples, and similarly, a second link may be referred to as a first link.

It should be further understood that sequence numbers of processes do not mean execution sequences in embodiments of this disclosure. The execution sequences of the processes should be determined based on functions and internal logic of the processes, and should not be construed as any limitation on the implementation processes of embodiments of this disclosure.

In this disclosure, the term "at least one" means one or more, and the term "a plurality of" means two or more. For example, a plurality of second packets mean two or more second packets. The terms "system" and "network" may be used interchangeably in this specification.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that the term "include" (or referred to as "includes", "including", "comprises", and/or "comprising"), when being used in this specification, specifies the presence of stated features, integers, steps, operations, elements, and/or components, but do not preclude the presence or addition of one or more other features, integers, steps, operations, elements, components, and/or groups thereof.

It should be further understood that, based on the context, the phrase "if determining" or "if detecting [a stated condition or event]" may be interpreted as a meaning of "when determining . . . ", "in response to determining . . . ", "when detecting [a stated condition or event]", or "in response to detecting . . . [a stated condition or event]".

It should be understood that determining B based on A does not mean that B is determined based on only A, but B may alternatively be determined based on A and/or other information.

It should further be understood that "one embodiment", "an embodiment", or "a possible implementation" mentioned throughout this specification means that particular features, structures, or characteristics related to the embodiments or implementations are included in at least one embodiment of this disclosure. Therefore, "in one embodiment", "in an embodiment", or "in a possible implementation" appearing throughout this specification does not necessarily mean a same embodiment. In addition, these specific features, structures, or properties may be merged in one or more embodiments in any proper manner.

What is claimed is:

1. A distance measurement method, comprising:
sending, by a first measurement component on a first line card, a measurement signal to a second connector on a second line card using a first connector on the first line card; and
determining, by the first measurement component on the first line card, a distance between the first connector and the second connector based on (a) the measurement signal, or (b) the measurement signal and a reflected signal of the measurement signal.

2. The method according to claim 1, further comprising:
receiving, by the first measurement component on the first line card, the reflected signal of the measurement signal.

3. The method according to claim 2, wherein sending the measurement signal to the second connector comprises:
sending, by the first measurement component on the first line card, the measurement signal to the second connector using a first signal cable configured on the first line card, wherein the first signal cable is configured to separately connect to the first measurement component on the first line card and the first connector, and is further configured to connect to a second signal cable configured on the second connector; and
wherein receiving the reflected signal of the measurement signal comprises:
receiving, by the first measurement component on the first line card using the first signal cable, the reflected signal of the measurement signal, wherein the reflected signal of the measurement signal is transmitted using the second signal cable.

4. The method according to claim 3, wherein lengths of the first signal cable and the second signal cable are lengths of n+1/4 periods, n is a positive integer, and the period is a transmission period of the measurement signal; and
wherein determining the distance between the first connector and the second connector based on the measurement signal and the reflected signal comprises:
determining, by the first measurement component on the first line card, an amplitude of a target signal obtained by superimposing the measurement signal and the reflected signal, and determining, by the first measurement component on the first line card, the distance between the first connector and the second connector based on the amplitude.

5. The method according to claim 1, wherein determining the distance between the first connector and the second connector based on the measurement signal and the reflected signal comprises:
determining, by the first measurement component on the first line card, a transmission time for transmitting the measurement signal based on a reflective edge of the reflected signal; and
determining, by the first measurement component on the first line card, the distance between the first connector and the second connector based on the transmission time and a transmission rate of the measurement signal.

6. The method according to claim 1, wherein determining the distance between the first connector and the second connector based on the measurement signal comprises:
receiving, by the first measurement component on the first line card, the measurement signal; and
determining, by the first measurement component on the first line card, the distance between the first connector and the second connector based on a transmission time and a transmission rate of the measurement signal.

7. The method according to claim 6, wherein sending the measurement signal to the second connector comprises:
sending, by the first measurement component on the first line card, the measurement signal to the second connector using a third signal cable configured on the first line card, wherein the third signal cable is configured to separately connect to the first measurement component on the first line card and the first connector, and is further configured to connect to a fourth signal cable configured on the second connector; and
wherein receiving the measurement signal comprises:
receiving, by the first measurement component on the first line card, the measurement signal using a fifth signal cable, wherein the fifth signal cable is configured to connect the first measurement component on the first line card to the first connector, and is further configured to connect to a sixth signal cable configured on the second connector, and the sixth signal cable is further connected to the fourth signal cable.

8. The method according to claim 6, wherein before determining the distance between the first connector and the second connector based on the transmission time and the transmission rate of the measurement signal, the method further comprises:
determining, by the first measurement component on the first line card, the transmission time of the measurement signal based on a sending time and a receiving time of the measurement signal; and
determining, by the first measurement component on the first line card, the transmission rate of the measurement signal based on a rate of an electrical signal in a vacuum and a relative dielectric constant of a material around a signal cable.

9. The method according to claim 8, wherein determining the transmission time of the measurement signal based on the sending time and the receiving time of the measurement signal comprises:
in response to determining that a quantity of times that the measurement signal passes through the first measurement component on the first line card is not less than a repetition threshold, determining, by the first measurement component on the first line card, the transmission time of the measurement signal based on the sending time and the receiving time of the measurement signal.

10. The method according to claim 1, wherein the first measurement component on the first line card and the first connector are located on a circuit board of the first line card, and the method further comprises:

calibrating, by the first measurement component on the first line card, the first measurement component on the first line card based on a loopback signal of the circuit board.

11. The method according to claim 1, wherein the first measurement component on the first line card is located in a chip, the first line card is a board, and the second line card is a backplane.

12. The method according to claim 1, wherein
the measurement signal is an in-position signal used to detect a connection status between the first connector and the second connector; and
determining the distance between the first connector and the second connector based on the measurement signal comprises:
when determining that the connection status between the first connector and the second connector is connected based on the in-position signal, determining, by the first measurement component on the first line card, the distance between the first connector and the second connector based on the in-position signal.

13. A distance measurement method, comprising:
receiving, by a second connector on a second line card, a measurement signal sent by a first measurement component on a first line card; and
sending, by the second connector on the second line card, a response result of the measurement signal to the first measurement component on the first line card, to enable the first measurement component on the first line card to determine a distance between the second connector on the second line card and a first connector on the first line card based on the measurement signal.

14. The method according to claim 13, wherein
the response result of the measurement signal is a reflected signal of the measurement signal;
receiving the measurement signal sent by the first measurement component on the first line card comprises:
receiving, by the second connector on the second line card using a second signal cable configured on the second connector, the measurement signal sent by the first measurement component on the first line card, wherein the second signal cable is configured to connect to a first signal cable configured on the first connector, and the first signal cable is configured to separately connect to the first measurement component on the first line card and the first connector; and
sending the response result of the measurement signal to the first measurement component on the first line card comprises:
sending, by the second connector on the second line card, the reflected signal to the first measurement component on the first line card by using the second signal cable.

15. The method according to claim 13, wherein
the response result of the measurement signal is the measurement signal;
receiving the measurement signal sent by the first measurement component on the first line card comprises:
receiving, by the second connector on the second line card using a fourth signal cable configured on the second connector, the measurement signal sent by the first measurement component on the first line card, wherein the fourth signal cable is configured to connect to a third signal cable configured on the first connector, and the third signal cable is configured to separately connect to the first measurement component on the first line card and the first connector; and sending the response result of the measurement signal to the first measurement component on the first line card comprises:
sending, by the second connector on the second line card, the measurement signal to the first measurement component on the first line card using a sixth signal cable configured on the second connector on the second line card, wherein the sixth signal cable is configured to connect to the fourth signal cable, and is further configured to connect to a fifth signal cable configured on the first connector, and the fifth signal cable is configured to connect the first measurement component on the first line card to the first connector.

16. The method according to claim 13, wherein the first measurement component on the first line card is located in a chip, the first line card is a board, and the second line card is a backplane.

17. The method according to claim 14, wherein lengths of the first signal cable and the second signal cable are lengths of $n+1/4$ periods, n is a positive integer, and the period is a transmission period of the measurement signal.

18. The method according to claim 13, further comprising determining, by the first measurement component on the first line card, the distance between the first connector and the second connector based on the measurement signal and a reflected signal;
wherein determining the distance between the first connector and the second connector based on the measurement signal and the reflected signal comprises:
determining, by the first measurement component on the first line card, an amplitude of a target signal obtained by superimposing the measurement signal and the reflected signal, and determining, by the first measurement component on the first line card, the distance between the first connector and the second connector based on the amplitude.

19. The method according to claim 13, further comprising determining, by the first measurement component on the first line card, the distance between the first connector and the second connector based on the measurement signal;
wherein determining the distance between the first connector and the second connector based on the measurement signal comprises:
receiving, by the first measurement component on the first line card, the measurement signal; and
determining, by the first measurement component on the first line card, the distance between the first connector and the second connector based on a transmission time and a transmission rate of the measurement signal.

20. The method according to claim 19, wherein before determining the distance between the first connector and the second connector based on the transmission time and the transmission rate of the measurement signal, the method further comprises:
determining, by the first measurement component on the first line card, the transmission time of the measurement signal based on a sending time and a receiving time of the measurement signal; and
determining, by the first measurement component on the first line card, the transmission rate of the measurement signal based on a rate of an electrical signal in a vacuum and a relative dielectric constant of a material around a signal cable.

* * * * *